(12) United States Patent
Sakai et al.

(10) Patent No.: US 9,667,901 B2
(45) Date of Patent: May 30, 2017

(54) IMAGING APPARATUS AND IMAGING SYSTEM

(71) Applicant: CANON KABUSHIKI KAISHA, Tokyo (JP)

(72) Inventors: Seiichirou Sakai, Yokohama (JP); Hiroki Hiyama, Sagamihara (JP); Kazuo Yamazaki, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 9 days.

(21) Appl. No.: 14/748,483

(22) Filed: Jun. 24, 2015

(65) Prior Publication Data

US 2016/0006968 A1    Jan. 7, 2016

(30) Foreign Application Priority Data

Jul. 2, 2014    (JP) .................................. 2014-136972

(51) Int. Cl.
*H04N 5/378* (2011.01)
*H04N 5/3745* (2011.01)
*H04N 5/357* (2011.01)

(52) U.S. Cl.
CPC .......... *H04N 5/378* (2013.01); *H04N 5/3575* (2013.01); *H04N 5/3745* (2013.01)

(58) Field of Classification Search
CPC .............................. H04N 5/378; H04N 5/3575
See application file for complete search history.

(56) References Cited

U.S. PATENT DOCUMENTS

| 6,501,109 | B1* | 12/2002 | Chi ................... H01L 27/14609 |
| | | | 257/223 |
| 6,670,990 | B1 | 12/2003 | Kochi et al. |
| 7,741,593 | B2 | 6/2010 | Iwata et al. |
| 7,755,688 | B2 | 7/2010 | Hatano et al. |
| 7,812,876 | B2 | 10/2010 | Hiyama et al. |
| 8,106,343 | B2 | 1/2012 | Arishima et al. |
| 8,106,955 | B2 | 1/2012 | Okita et al. |
| 8,760,337 | B2 | 6/2014 | Yamazaki |
| 8,872,092 | B2 | 10/2014 | Ryoki et al. |
| 9,060,139 | B2 | 6/2015 | Yamazaki |
| 9,083,906 | B2 | 7/2015 | Nakamura et al. |
| 2005/0237400 | A1* | 10/2005 | Blerkom .............. H04N 5/3575 |
| | | | 348/241 |

(Continued)

FOREIGN PATENT DOCUMENTS

JP    2009-194569 A    8/2009

*Primary Examiner* — Christopher K Peterson
(74) *Attorney, Agent, or Firm* — Fitzpatrick, Cella, Harper & Scinto

(57) ABSTRACT

Provided is an imaging apparatus and an imaging system that can suppress high-brightness darkening phenomenon without preventing achievement of high-speed operation. The imaging apparatus includes: pixels each outputting a signal based on photoelectric conversion to each of signal lines; clip units each having a first transistor for clipping the voltage of each of the signal lines; a holding capacitor having a first electrode connected to a control electrode of the first transistor, and having a second electrode; a shift unit configured to supply, to the second electrodes, a plurality of voltages having values different from each other; and a voltage supplying unit provided separately from the shift unit and supplying a first voltage to the second electrodes.

11 Claims, 16 Drawing Sheets

(56) References Cited

U.S. PATENT DOCUMENTS

2009/0200449 A1*   8/2009   Iwata .................. H04N 5/3598
                                                              250/206
2014/0333815 A1*  11/2014   Iwane .................... H04N 5/378
                                                              348/308
2015/0077607 A1    3/2015   Yamazaki et al.

* cited by examiner

IMAGING APPARATUS AND IMAGING SYSTEM

BACKGROUND OF THE INVENTION

Field of the Invention

The present invention relates to an imaging apparatus and an imaging system.

Description of the Related Art

Japanese Patent Application Laid-Open No. 2009-194569 (hereinafter, Patent Literature 1) discloses high-brightness darkening phenomenon generated by irradiation with significantly strong light, such as sunlight, in a MOS type imaging apparatus, and a method of suppressing the phenomenon. Patent Literature 1 discloses a shift unit for shifting the potential of a second electrode of a holding capacitor to reduce the difference between the reset level and the clipping potential.

Patent Literature 1 discloses one holding capacitor and one shift unit. In view of functionality, a switch, a clip unit and a holding capacitor are required for each column to hold pixel-by-pixel variation. The single shift unit is shared by all the columns. While full. HD moving images to 4K2K or 8K4K and high-frame rate moving images are required, the time of operation for suppressing the "high-brightness darkening phenomenon" disadvantageously prevents achievement of high-speed reading.

SUMMARY OF THE INVENTION

The present invention has an object to provide an imaging apparatus and an imaging system that can suppress the high-brightness darkening phenomenon without preventing achievement of high-speed operation.

According to an aspect of the present invention, an imaging apparatus comprises: a plurality of pixels arranged in a plurality of rows and in a plurality of columns; a plurality of signal lines, to each of which a signal from the pixel is outputted; a plurality of clip units, each having a first transistor, and arranged corresponding to each of the plurality of signal lines, to clip a voltage of the each of the signal lines; a holding capacitor having a first electrode connected to a control electrode of the first transistor, and having a second electrode; and a shift unit configured to supply, to the second electrodes, a plurality of voltages having values different from each other, wherein the imaging apparatus further comprises a voltage supplying unit configured to supply a first voltage through a wiring to the second electrode, and the wiring is connected electrically to each of the plurality of second electrodes, and the voltage supplying unit and the shift unit are connected to the wiring, and connections between each of the second electrodes and the wiring are arranged between a connection between the voltage supplying unit and the wiring and a connection between the shift unit and the wiring.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

(First Embodiment)

Figure 1:
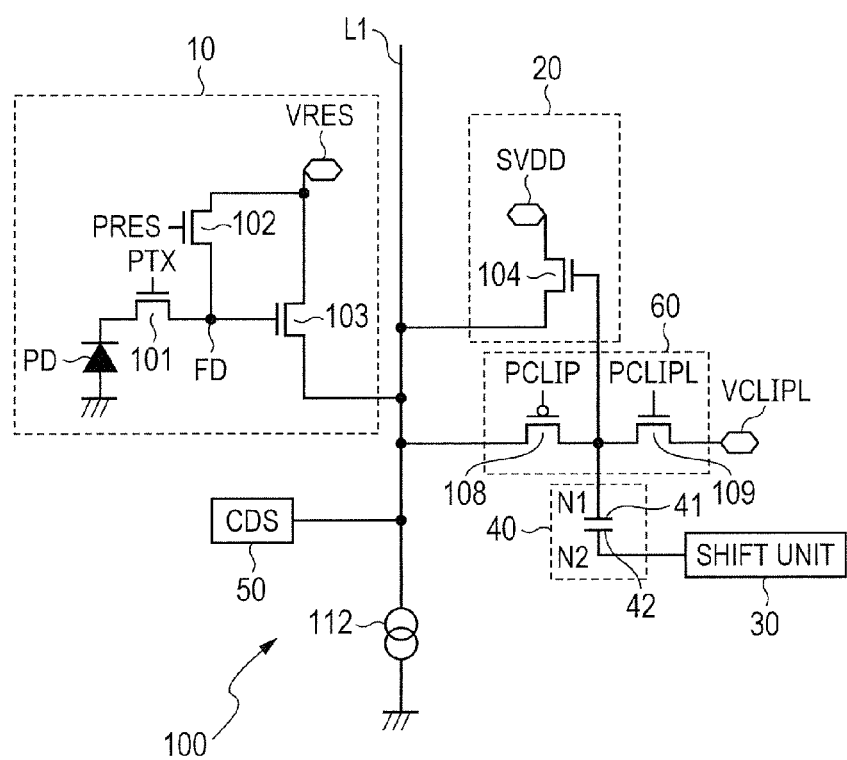
FIG. 1 is a circuit diagram of an imaging apparatus according to a first embodiment.

FIG. 1 is a circuit diagram illustrating a configuration example of an imaging apparatus 100 according to a first embodiment of the present invention. The imaging apparatus 100 includes pixels 10, switches 60, holding capacitors 40, a shift unit 30, clip units 20, and a CDS circuit (difference circuit) 50. The CDS circuit 50 is provided outside the imaging apparatus 100, and can externally perform a CDS process. The multiple pixels 10 are arranged in a two-dimensional matrix in an imaging area of the imaging apparatus 100. That is, the pixels 10 are arranged in a plurality of rows and a plurality of columns. The pixels 10 on the same column are connected to a vertical signal line L1. A plurality of vertical signal lines L1 is arranged corresponding to respective columns each on which the multiple pixels 10 are arranged. Each of the pixels 10 includes a photoelectric converting portion. PD, a transfer portion 101, a charge-to-voltage converting portion FD, an amplifying transistor (output unit) 103 and a reset transistor 102.

The photoelectric converting portion PD converts received light into charges. The photoelectric converting portion PD is, for example, a photodiode. The anode of the photoelectric converting portion PD is grounded. The cathode of the photoelectric converting portion PD is connected to the transfer portion 101. The transfer portion 101 transfers the charges converted by the photoelectric converting portion PD, to the charge-to-voltage converting portion FD. The transfer portion 101 is, for example, a transfer transistor. The charge-to-voltage converting portion FD converts the charges transferred by the transfer portion 101 into a voltage. The charge-to-voltage converting portion FD is, for example, a floating diffusion.

The amplifying transistor 103 amplifies the voltage converted by the charge-to-voltage converting. Portion FD, and outputs the amplified voltage to the vertical signal line L1. The gate of the amplifying transistor 103 is electrically connected to the charge-to-voltage converting portion FD. The amplifying transistor 103 performs a source follower operation together with a constant current source 112 connected to this transistor via the vertical signal line L1, amplifies a signal based on the voltage of the charge-to-voltage converting portion FD and outputs the amplified signal to the vertical signal line L1.

The reset transistor 102 resets the charge-to-voltage converting portion FD in a predetermined period. The reset transistor 102 includes a drain connected to the node of a power source voltage VRES, and a source connected to the charge-to-voltage converting portion FD. The reset transistor 102 is on, while an active driving pulse ORES is supplied to the gate of this transistor, thereby resetting the charge-to-voltage converting portion FD to a potential according to the power source voltage VRES.

Here, the power source voltage VRES is any of two potentials, which are a potential VRESH for resetting the charge-to-voltage converting portion FD in a pixel 10 to be read among the pixels 10, and a potential VRESL for resetting the charge-to-voltage converting portion FD of a pixel 10 not to be read among the pixels 10. According to a configuration of VRESH>VRESL, only the amplifying transistor 103 in the pixel 10 to be read is turned on so as to allow current specified by the constant current source 112 to flow.

In this embodiment, a row of the pixels 10 is selected or not selected according to the above method. However, the present invention is not limited to this method. The advantageous effects of this embodiment, which are described below, can be achieved also by a method of simply connecting a selection switch to the amplifying transistor 103.

Hereinafter, the "reset level" indicates a potential to be outputted to the vertical signal line L1 in a state where the charge-to-voltage converting portion FD is reset by the reset transistor 102. Meanwhile, an after mentioned "noise level" indicates a potential actually outputted to the vertical signal line L1 in a state where the charge-to-voltage converting portion FD is reset by the reset transistor 102. For example, the noise level can be outputted when the photoelectric converting portion PD is irradiated with strong light. The noise level is a signal after the first signal is changed by change in the potential of the charge-to-voltage converting portion FD while the signal (first signal) on resetting of the charge-to-voltage converting portion FD is outputted to the vertical signal line L1. An after-mentioned "optical signal level" is the potential of a signal outputted by the amplifying transistor 103 to the vertical signal line L1 in a state where the charges of the photoelectric converting portion PD are transferred by the transfer portion 101 to the charge-to-voltage converting portion ID.

A switch 60 inputs the voltage of the vertical signal line L1 into a holding capacitor 40 in a state where the charge-to-voltage converting portion. ID is reset, and transfers a predetermined potential VCLIPL to the holding capacitor 40 in a state where the charges transferred by the transfer portion 101 are converted into a voltage by the charge-to-voltage converting portion. FD. The potential VCLIPL is set to a low potential within a range where the constant current source 112 is not cut off. The switch 60 includes a switch transistor 108 and a switch transistor 109. In this case, the switch transistor 108 is a PMOS transistor, and the switch transistor 109 is an NMOS transistor.

The switch transistor 108 is turned on by an active driving pulse PCLIP being supplied to the gate of this transistor in a state where the charge-to-voltage converting portion ID is reset. The switch transistor 108 is turned off by the inactive driving pulse PCLIP being supplied to the gate of this transistor in a state where the charges transferred by the transfer portion 101 are converted into the voltage by the charge-to-voltage converting portion FD.

The switch transistor 109 is turned off by the inactive driving pulse PCLIPL being supplied to the gate of this transistor in a state were the charge-to-voltage converting portion FD is reset. The switch transistor 109 is turned on by the active driving pulse PCLIPL being supplied to the gate of this transistor in a state where the charges transferred by the transfer portion 101 are converted into the voltage by the charge-to-voltage converting portion FD.

The holding capacitor 40 holds the voltage transmitted through the vertical signal line L1 in a state where the charge-to-voltage converting portion PD is reset. The holding capacitor 40 includes a first electrode 41 and a second electrode 42. A node N1 is connected to the first electrode 41, and a node N2 is connected to a second electrode 42. The first electrode 41 is connected to the switch 60. The voltage transmitted through the vertical signal line L1 is transferred to the first electrode 41 in a state where the charge-to-voltage converting portion FD is reset. The predetermined potential VCLIPL is transferred to the first electrode 41 in a state where the charges transferred by the transfer portion 101 are converted to the voltage by the charge-to-voltage converting portion FD. The second electrode 42 is an electrode opposite to the first electrode 41. The second electrode 42 is connected to the shift unit 30.

The shift unit 30 shifts the potential of the second electrode 42 of the holding capacitor 40 in a direction where the potential of the second electrode 42 approaches the reset level. Here, the potential approaching direction indicates a rising operation in the case where the potential rises, and a descent operation in the case where the potential decreases. The shift unit 30 shifts the potential of the second electrode 42 of the holding capacitor 40 in the direction where the potential of the second electrode 42 approaches the reset level after the voltage of the vertical signal line L1 is transferred by the switch 108 to the first electrode 41. The shift unit 30 can thus shift the potential of the first electrode 41 of the holding capacitor 40 such that the potential of the first electrode 41 can approach the reset level. The amount of shift by the shift unit 30 is at least the amount of voltage drop at the clip unit 20 and equal to or lower than the difference between the voltage of the noise level and the voltage of the reset level. More specifically, provided that the signal outputted to the vertical signal line L1 in a state where the charge-to-voltage converting portion FD is reset is the first signal, it can be described that the upper limit value is equal to or less than the difference between the signal acquired after the change in the potential of the charge-to-voltage converting portion FD changes the first signal and this first signal.

Furthermore, as described later, the clip unit 20 clips a potential reduced from the potential supplied to the gate of an NMOS transistor 104. Consequently, the amount of shift by the shift unit 30 can be set so as to reduce the amount of voltage drop. In a more appropriate case, this amount is set equal to the amount of voltage drop at the clip unit 20. If the amount of voltage drop at the clip unit 20 is at a level with no problem in view of the operation range of the vertical signal line L1, shifting by the shift unit 30 is not necessary.

The clip units 20 are provided corresponding to the respective columns of the vertical signal lines L1. The holding capacitors 40 are provided corresponding to the respective columns of the clip units 20. The clip unit. 20 clips the potential of the vertical signal line L1 to a clipping potential acquired by subtracting the amount of voltage drop at the clip unit 20 from the potential of the first electrode 41. The clip unit 20 includes the NMOS transistor 104. The NMOS transistor 104 has a gate connected to the first electrode 41 of the holding capacitor 40, a second main electrode (drain) connected to the node of a power source potential SVDD, and a first main electrode (source) connected to the vertical signal line L1. The potential of the first electrode 41 is inputted into the gate of the NMOS transistor 104, which clips the potential of the vertical signal line L1 to a clipping potential acquired by subtracting at least the amount of voltage drop including the threshold voltage component from the potential of the first electrode 41. Consequently, it is appropriate that the shift unit 30 can be level-shifted to a value of at least the threshold voltage. As to a specific operation, during output of the signal (first signal) to be outputted to the vertical signal line L1 in a state where the charge-to-voltage converting portion SD is reset, change in the potential of the charge-to-voltage converting portion FD sometimes changes the first signal. The difference between the changed first signal and the potential, of the gate of the MOS transistor 104 exceeds the threshold of the MOS transistor 104, thereby allowing the MOO transistor 104 to clip the potential of the vertical signal line L1.

The CDS circuit 50 performs a correlated double sampling (CDS) process that calculates the difference between the voltage at the noise level of the photoelectric converting portion PD and the voltage at the optical signal level, thereby acquiring an image signal from which the noise component is removed. More specifically, in a state where the charge-to-voltage converting portion FD is reset, the first signal (noise level) is outputted to the vertical signal line L1. In a state where the charges of the photoelectric converting portion PD are transferred by the transfer portion 101 to the charge-to-voltage converting portion FD, a second signal (optical signal level) is outputted to the vertical signal line L1. The CDS circuit 50 performs a subtraction process (CDS process) between the first signal and the second signal. The CDS circuit 50 outputs the acquired image signal to the following stage.

Figure 3:
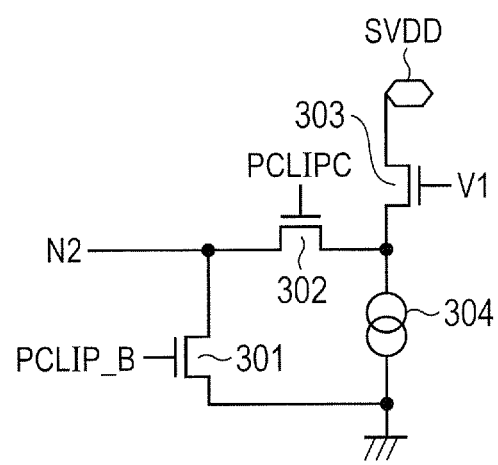
FIG. 3 is a circuit diagram of a shift unit according to the first embodiment.

FIG. 3 is a circuit diagram illustrating a configuration example of the shift unit 30. The shift unit includes a switch transistor 301, a switch transistor 302, a source follower (SF) transistor 303 and a constant current source 304. Each of the switch transistor 301, the switch transistor 302 and the SF transistor 303 is an NMOS transistor.

The switch transistor 301 is on, while the driving pulse PCLIP_B is at the high level, thereby supplying the ground potential to the node N2. In this state, the switch transistor 302 as off.

Next, the switch transistor 302 is on, while the driving pulse PCLIPC is at the high level. The SF transistor 303 performs the source follower operation together with the constant current source 304, and supplies a voltage based on the potential V1 to the node N2. In this state, the switch transistor 301 is off.

Figure 2:
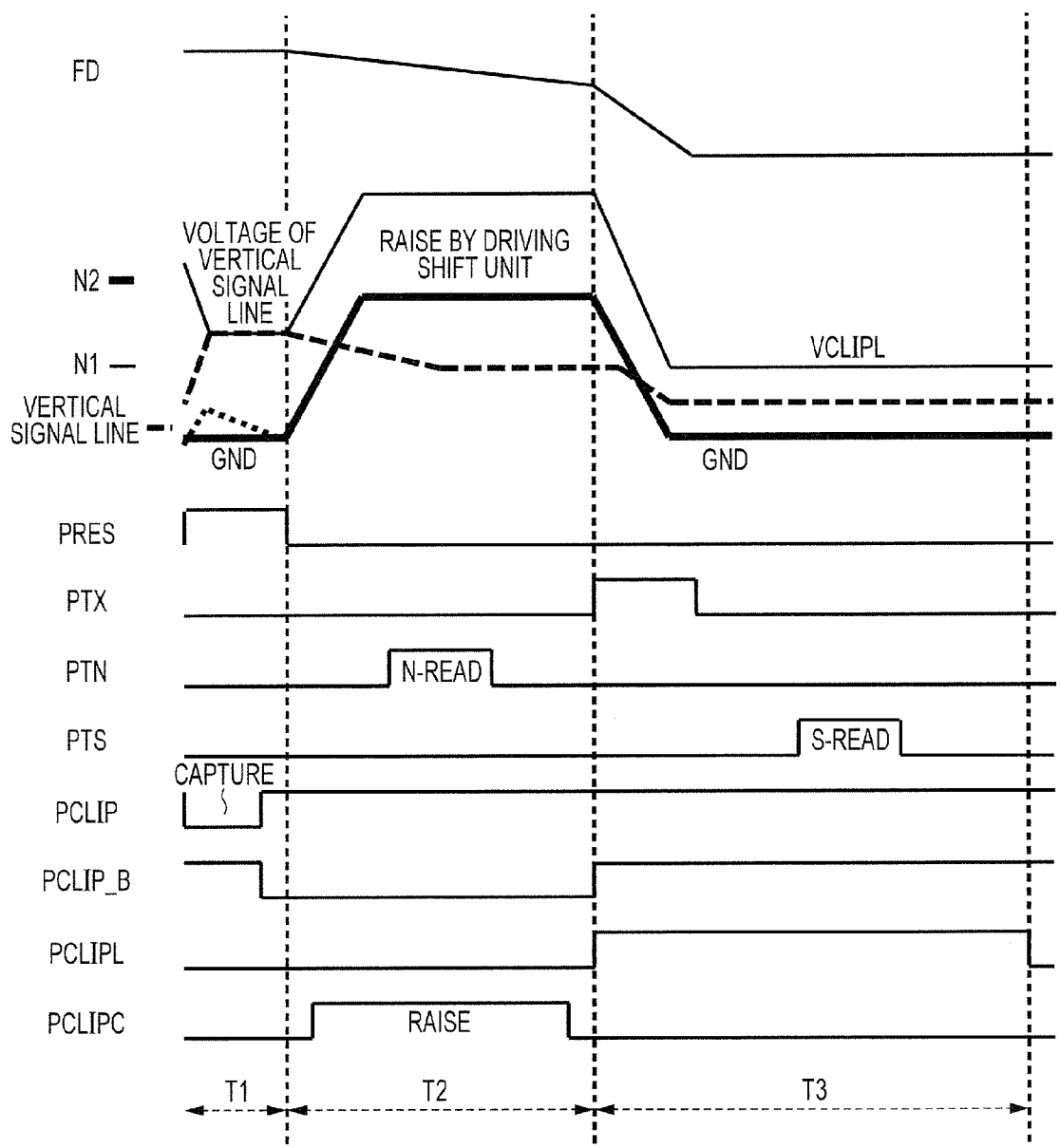
FIG. 2 is a timing chart of the imaging apparatus according to the first embodiment.
Figure 4:
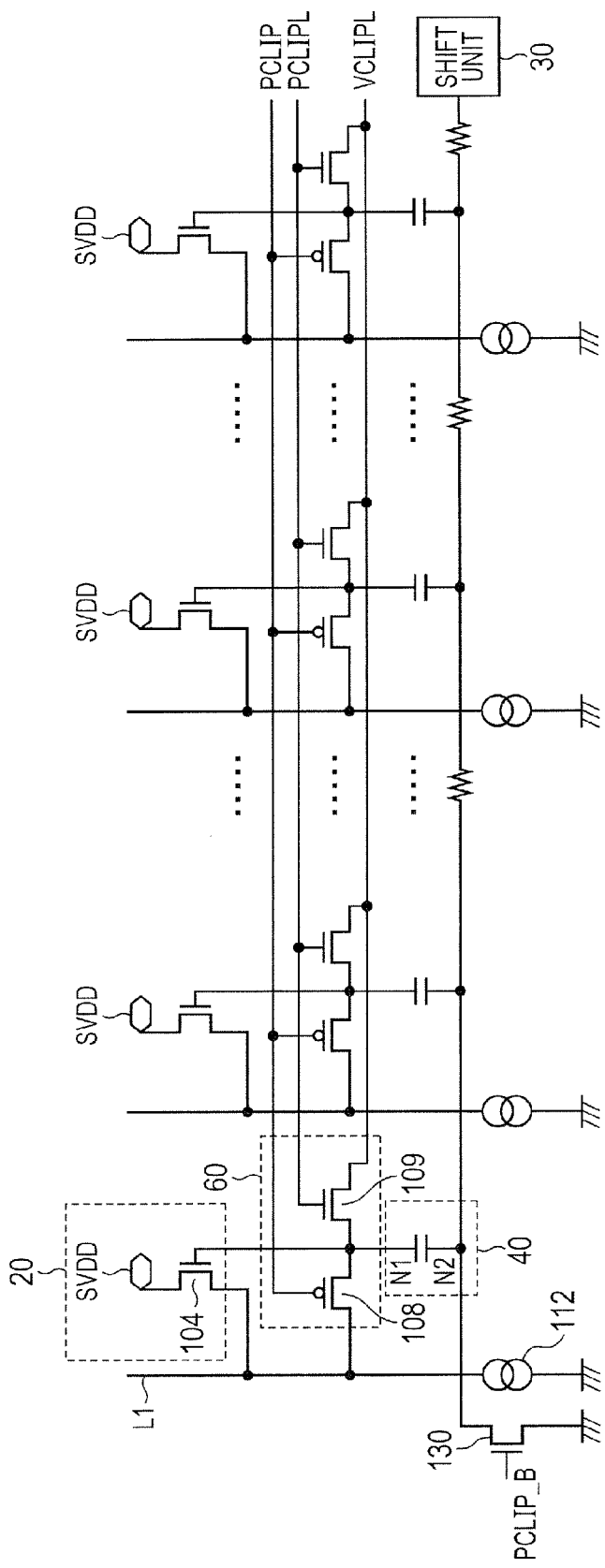
FIG. 4 is a circuit diagram of a plurality of columns of the first embodiment.

FIG. 4 illustrates a circuit diagram where multiple columns of the clip units 20, the holding capacitors 40 and the switches 60 are arranged, and a layout of the circuit elements. Although not illustrated for simplicity, the multiple pixels 10 are connected to the vertical signal lines L1. The signs in FIG. 4 correspond to the respective signs in FIG. 1. The single shift unit 30 is provided corresponding to the multiple columns of the clip units 20, the holding capacitors 40 and the switches 60. An NMOS transistor 130 arranged on a side opposite to the shift unit 30 includes a source connected to a ground potential node, a drain connected to the node N2, and a gate into which a signal PCLIP_B is inputted. The shift unit includes a circuit having the configuration illustrated in FIG. 3. As with the NMOS transistor 301 in FIG. 3, the NMOS transistor 130 is a switch for fixing the node N2 to the (ground potential during a period T1 (FIG. 2). The NMOS transistor 130 is a voltage supplying unit that supplies the second electrodes with a predetermined voltage via wiring.

The pixels 10 output signals based on photoelectric conversion to the respective vertical signal lines L1. The clip units 20 include the first transistors 104 for clipping the potentials of the respective vertical signal lines L1. The holding capacitors 40 each include the first electrode 41 and the second electrode 42. The first electrodes 41 are connected to the control electrodes (gates) of the respective first transistors 104. The switches 60 connect the first electrodes 41 of the holding capacitors 40 to the respective vertical signal lines L1. The shift unit 30 causes the transistors 301 and 302 to supply the second electrode 42 of each of the holding capacitors 40 with voltages having different values. The NMOS transistor 130 is a voltage unit that is provided separately from the shift unit 30 and supplies the second electrodes 42 of the holding capacitors 40 with the around potential (first voltage). The shift unit 30 is connected to the holding capacitor 40 at one end among the holding capacitors 40 arranged over the multiple columns. Meanwhile, the NMOS transistor 130 is connected to the holding capacitor 40 on the other end among the holding capacitors 40. That is, the shift unit 30 is provided at the one end of an area where the holding capacitors 40 are arranged over the multiple columns, while the NMOS transistor 130 is provided at the other end opposite to the one end connected with the shift unit 30. The second electrodes of the holding capacitors 40 are electrically connected to each other via wiring. The NMOS transistor 130 is arranged opposite to the shift unit 30, sandwiching connection positions of the wiring where this transistor is connected to the respective second electrodes. In other words, the voltage supplying unit and the shift unit are connected to the wiring. And, connections between each of the second electrodes and the wiring are arranged between a connection between the voltage supplying unit and the wiring and a connection between the shift unit and the wiring.

FIG. 2 is a timing chart illustrating a method of driving the imaging apparatus 100. Potentials FD, N2 and N1 illustrate the potentials of the respective nodes. Driving pulses "PRES" to "PCLIPC" are also illustrated.

First, a normal operation is described. During period T1, the driving pulse PRES is applied to the reset transistor 102, thereby resetting the charge-to-voltage converting portion FD in the pixel 10 to be read to the reset potential. VRESH. The driving pulse PCLIP is then applied to the switch transistor 108 to turn on this transistor. Here, in a state where the charge-to-voltage converting portion PT is reset, a voltage VL1res at the reset level to be transmitted through the vertical signal line L1 is represented by Expression (1).

$$VL1res = VRESH - Vth0 - Vth1 - \Delta ov1 \qquad (1)$$

Vth0: the threshold voltage of the reset transistor 102
Vth1: the threshold voltage of the amplifying transistor 103
$\Delta ov1$: the overdrive voltage of the amplifying transistor 103

The voltage $\Delta ov1$ is defined the characteristics of the amplifying transistor 103 and the value of current of the constant current source 112. In a state where the charge-to-voltage converting portion FD is reset, the voltage of the noise level transmitted through the vertical signal line L1 is charged in the holding capacitor 40. The potential of the node N1 becomes equal to the noise level transmitted through the vertical signal line L1, if the noise level is equal to the reset level, the potential of the node N1 becomes equal to the reset level.

During the period T1, the potential of the node N2 is fixed to the ground potential by turning on the NMOS transistors 130 and 301. The node N1 is connected to the gate of the NMOS transistor 104, thereby allowing the voltage held in the holding capacitor 40 to be fed back to the gate of the NMOS transistor 104.

During the period T2, turning off the NMOS transistors 130 and 301 increases the potential of the node N2 from the ground potential to an arbitrary potential V1. The amount $\Delta VN2$ of increase in the potential of the node N2 is represented by Expression.

$$\Delta VN2 = V1 \qquad (2)$$

As the increase in the potential of the node N2, the potential of the node N1 increases accordingly. The amount $\Delta VN1$ of increase in the potential of the node N1 is represented by Expression (3).

$$\Delta VN1 = K \times \Delta VN2 \qquad (3)$$

In Expression (3), K is a proportionality constant. The potential VN1 of the node N1 is thus represented by Expression (4).

$$VN1 = VRESH - Vth0 - Vth1 - ov1 + \Delta VN1 \qquad (4)$$

During the period T2, the CDS circuit 50 receives an active driving signal PTN, and holds the voltage at the noise level transmitted through the vertical signal line L1, thereby sampling the noise level of the pixel 10.

During the period T3, to sample the optical signal level of the pixel 10, the pulse PCLIPL is applied to the switch transistor 109 to turn on this transistor, and writes the potential VCLIPL as the potential of the node N1. The potential VCLIPL is set low within a range where the constant current source 112 is not cut off. At this time, the potential of the vertical signal line L1 is clipped so as not to be a potential lower than VCLIPL-Vth2 (the threshold voltage of the NMOS transistor 104)-$\Delta ov2$ (the overdrive voltage of the NMOS transistor 104). Turning on the NMOS transistors 130 and 301 reset the potential of the node N2 to the ground potential for the next reading of the pixel 10.

When the signal PTX becomes the high level, the transfer portion 101 transfers the charges of the photoelectric converting portion PD to the charge-to-voltage converting portion FT. The CDS circuit 50 receives the active driving signal PTS, and holds the voltage of the optical signal level transmitted through the vertical signal line L1, thereby sampling the optical signal level of the pixel 10. The CDS circuit 50 outputs the difference between the noise level and the optical signal level.

In each of the pixels 10, the signal PRES causes the charge-to-voltage converting portion OD to be in a reset state during the first period T1, and the reset state of the charge-to-voltage converting portion FD is canceled during a second period T2, T3 subsequent to the first period T1. The signal PCLIP_B causes the NMOS transistors 130 and 301 to connect the second electrodes 42 to the node of the ground potential (first voltage) during the first period T1. These transistors disconnect the second electrodes 42 from the node of the ground potential (first voltage) during the second period T2, T3. The node N2 is connected to the second electrode 42 to have the same voltage as the second electrode 42 has.

Each of the pixels 10 outputs the first signal to the vertical signal line L1 during the period T2 in a state where the charge-to-voltage converting portion FD is reset, and outputs the second signal to the vertical signal line L1 during the period T3 in a state where the charges of the photoelectric converting portion Pt) are transferred by the transfer portion 101 to the charge-to-voltage converting portion ITC. The first signal is at the noise level. The second signal is at the optical signal level. Since the signal PCLIP_B is at the low level during the period T2 in which the pixel 10 outputs the first signal, the NMOS transistors 130 and 301 disconnect the second electrode 42 from the node of the ground potential (first voltage). Since the signal PCLIP_B is at the high level during the period T3 in which the pixel 10 outputs the second signal, the ENDS transistors 130 and 301 connect the second electrodes 42 to the node of the ground potential (first voltage).

As described above, the potential of the node N1 is the potential VL1res during the period T1, and is the potential VCLIPL during the period T3. The potential of the node N2 is the ground potential during each of the periods T1 and T3. The potential of the node N1 varies by VL1res-VCLIPL during transition from the period T3 to the period T1 for reading the pixel 10 on the next row. The potential of the node N2 is kept to be the ground potential GND. Charge/discharge current according to the difference between the potentials of the nodes N1 and N2 ((VL1res-VCLIPL)-GND)×the number of columns N flows into the holding capacitor 40. What supplies the charge/discharge current to fix the potential of the node N2 to the ground potential during the period T1 is the NMOS transistor 301 of the shift unit 30 and the NMOS transistor 130. If there is no NMOS transistor 130, the number of holding capacitors is, for example, at least 5000 (columns), and the resistance of wiring from the NMOS transistor 301 to the holding capacitor 40 at the position farthest from the NMOS transistor 301 is, for example, at least 500Ω. In this case, a certain time period is required until the potential of the node N2 is stabilized. For example, a period of several microseconds is required, until the potential of the node N2 is stabilized, in some cases.

This point is a problem in the conventional art. The voltage held between the nodes N1 and N2 of the holding capacitor 40 is VL1res-0 (GND)=VL1res during the period T1, and is VL1res-(1-K)$\Delta VN2$ during the period T2. Typically, K<1. During transition from the period T1 to the period T2, the displacement current flowing into the holding capacitor 40 is not large.

The voltage held between the nodes N1 and N2 of the holding capacitor 40 is VCLIPL-0 (GND)=VCLIPL during the period. T3. The displacement current at this time is large. However, the period for sampling the optical signal level of the pixel 10 is the order of microseconds. Consequently, reduction in time is not affected. During transition from the period 13 to the period T1, the displacement current corresponding to (VL1res-VCLIPL)×holding capacitor 40 occurs. This requires time equal to or longer than time necessary for reading. The period T1 is thus long.

Meanwhile, in FIG. 4, the NMOS transistor 130 for fixing the node N2 to the around potential is arranged on the side opposite to the shift unit 30. That is, in addition to the shift unit 30, a voltage supplying unit for supplying a voltage to cause the node N2 to be at the ground potential is arranged. As a result, the position farthest from the NMOS transistors 130 and 301 is at the center of the wiring that connects the nodes N2 on the columns to each other. Consequently, in comparison with the case of resetting only by the NMOS transistor 301 of the shift unit 30, the resistance of wiring and the number of holding capacitors to be reset are halved, and the CR time constant becomes about a quarter. Consequently, the stabilization period can be reduced to about a quarter. The reading operation period can thus be reduced, and the frame speed can be improved.

Next, the operation during the period T2 in the case where the pixels 10 are irradiated with strong light, such as sunlight, is described. When the pixel 10 is irradiated with the strong light, such as sunlight, charges (electrons) overflowing from the photoelectric converting portion PD reduce the potential of the charge-to-voltage converting portion PD. This reduction, in turn, reduces the noise level transmitted through the vertical signal line L1, from the reset level accordingly.

Here, a case is assumed where the shift unit 30 does not shift the potential of the second electrode 42 of the holding capacitor 40. In this case, in the NMOS transistor 104, the potential of the vertical signal line L1 captured by the switch 60 is inputted into the gate without modification, and the potential of the vertical signal line L1 is clipped to the clipping potential Vclip represented by Expression (5). The clipping potential Vclip can be represented by Expression (5).

$$Vclip=VRESH-Vth0-Vth1-\Delta ov1-Vth2-\Delta ov2 \quad (5)$$

Vth2: the threshold voltage of the NMOS transistor 104
Δov2: the overdrive voltage of the NMOS transistor 104

That is, the clipping potential Vclip is at a level defined by subtracting the voltage of Expression (6) from the reset level.

$$VL1res-Vclip=Vth2+\Delta ov2 \quad (6)$$

As represented by Expression (6), the difference between the reset level and the clipping potential is at least the amount of voltage drop Vth2 at the clip unit 20. That is, it is difficult to reduce the difference between the reset level and the clipping potential to be lower than the amount of voltage drop at the clip unit 20.

Meanwhile, in this embodiment, the shift unit 30 increases the potential of the second electrode 42 of the holding capacitor 40 by ΔVN2 in Expression (2), in this case, the potential defined by increasing the potential of the vertical signal line L1 by ΔVN1 in Expression (3) is inputted into the gate of the NMOS transistor 104, which clips the potential of the vertical signal line L1 to clipping potential VclipH represented by the following Expression (7). The clipping potential VclipH is thus represented by Expression (7).

$$VclipH=VRESH-Vth0-Vth1-\Delta ov1+\Delta VN1-Vth2-\Delta ov2 \quad (7)$$

Δov2: the overdrive voltage of the NMOS transistor 104

That is, the clipping potential VclipH is at a level defied by reducing the voltage in Expression (8) from the reset level.

$$VL1res-VclipH=(Vth2+\Delta ov2)-\Delta VN1 \quad (8)$$

An appropriate lower limit of (Vth2+Δov2)−ΔVN1 is zero at which VL1res matches VclipH. Furthermore, according to an appropriate mode, the shift unit 30 operates such that (Vth2+Δov2)−ΔVN1 is less than Vth2. This condition is represented in an expression, which is Expression (9).

$$0 \le (Vth2+\Delta ov2)-\Delta VN1 < Vth2 \quad (9)$$

From Expression (9), Expression (10) is derived. If the potential increased by ΔVN1 that satisfies Expression (10) is inputted into the gate of the NMOS transistor 104, the difference between the reset level and the clipping potential can be smaller than the amount of voltage drop at the clip unit 20.

$$\Delta ov2 < \Delta VN1 \le Vth2+\Delta ov2 \quad (10)$$

That is, if the shift unit 30 increases the potential of the second electrode 42 of the holding capacitor 40 by ΔVN2 that satisfies Expression (11) according to Expressions (3) and (10), the difference between the reset level and the clipping potential can be smaller than the amount of voltage drop at the clip unit 20. The operation during the period T3 is substantially identical to the normal operation. The difference is that irradiation with strong light causes the potential of the vertical signal line L1 to be clipped to VCLIPL−Vth2−Δov2.

$$\Delta ov2/K < \Delta VN2 \le (Vth2+\Delta ov2)/K \quad (11)$$

As described above, during the period T1, the wiring of the nodes N2 is reset to the ground potential from the opposite sides, thereby halving the resistance of wiring and the number of holding capacitors to be reset, and reducing the CR time constant to about a quarter. Consequently, the stabilization period can be reduced to about a quarter. Thus, the reading operation period can be reduced, and the frame speed can be improved. During the period. T2, the difference between the reset level and the clipping potential is set smaller than the amount of voltage drop at the clip unit 20. This setting can effectively suppress the high-brightness darkening phenomenon from occurring. According to this embodiment, the potential of the vertical signal line L1 is shifted and fed back to the gate of the NMOS transistor 104. The feedback can suppress adverse effects of variation in characteristics of the pixels 10 (variation in threshold voltage).

(Second Embodiment)

An imaging apparatus of a second embodiment of the present invention is described. The imaging apparatus of this embodiment has a configuration analogous to the configuration in FIG. 1. The NMOS transistor 104 is a depression type transistor. The threshold voltage Vth is minus. The configuration of the shift unit 30 is different from the configuration of the first embodiment. The difference of this embodiment from the first embodiment is hereinafter described.

Figure 5:
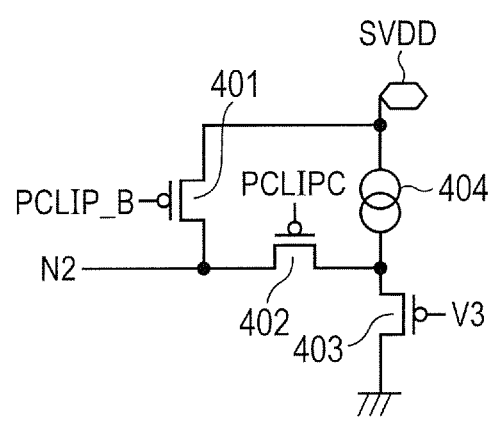
FIG. 5 is a circuit diagram of a shift unit according to a second embodiment.

FIG. 5 is a circuit diagram illustrating a configuration example of the shift unit 30 according to this embodiment. The shift unit 30 includes a switch transistor 401, a switch transistor 402, a source follower (SF) transistor 403 and a constant current source 404. Each of the switch transistor 401, the switch transistor 402 and the SF transistor 403 is a PMOS transistor.

The switch transistor 401 is on, while the driving pulse PCLIP_B is at the low level, thereby supplying the power source voltage SVDD to the node N2. At this time, the switch transistor 402 is off.

Next, the switch transistor 402 is on, while the driving pulse PCLIPC is at the low level. The SF transistor 403 performs the source follower operation together with the constant current source 404, and supplies a voltage based on a potential. V3 to the node N2. At this time, the switch transistor 401 is off.

Figure 6:
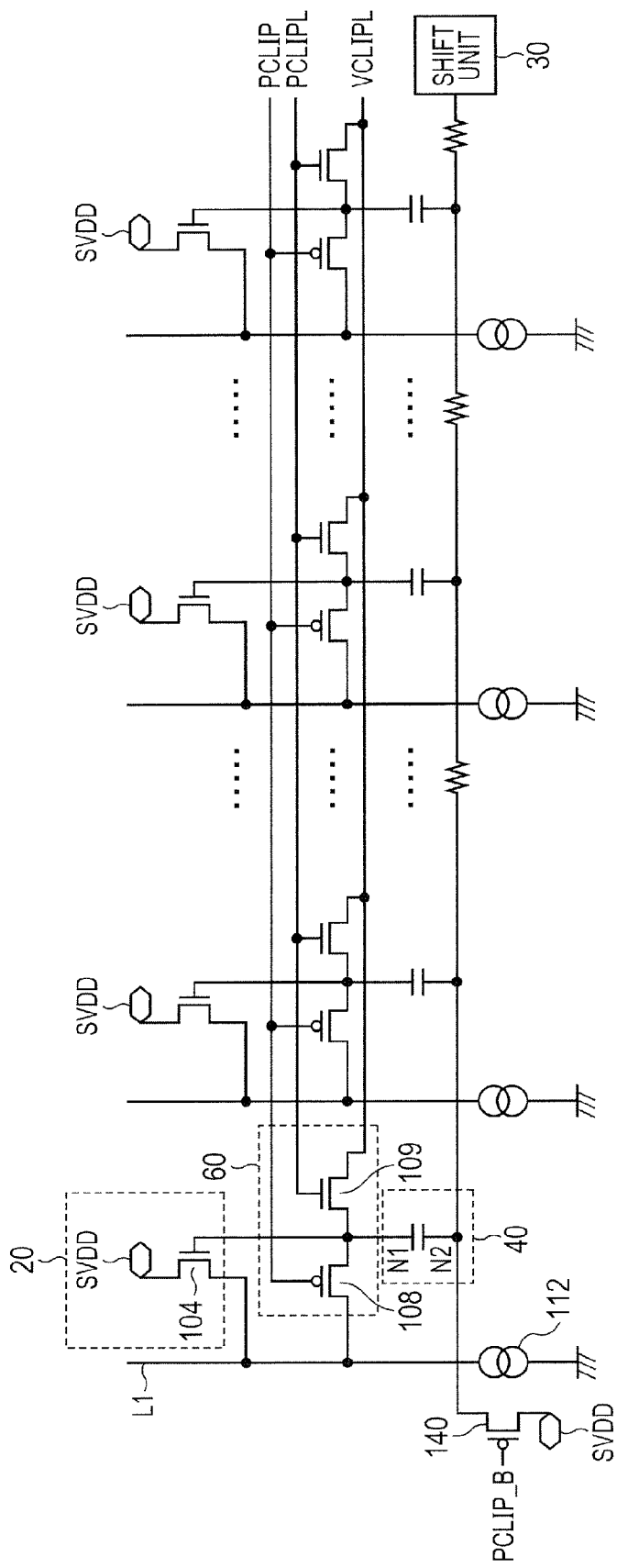
FIG. 6 is a circuit diagram of a plurality of columns of the second embodiment.

FIG. 6 illustrates circuit diagram where multiple columns of clip units 20, holding capacitors 40 and switches 60 according to this embodiment are arranged. Although not illustrated for simplicity, multiple pixels 10 are connected to each vertical signal line L1. The signs in FIG. 6 correspond to the respective signs in FIG. 1. Only one single shift unit 30 is provided corresponding to the multiple columns of the clip units 20, the holding capacitors 40 and the switches 60. A PMOS transistor 140 arranged on a side opposite to the shift unit 30 includes a source connected to the node of the power source voltage SVDD, a drain connected to the node N2, and a gate into which the signal PCLIP_B is inputted. The PMOS transistor 140 corresponds to the NMOS transistor 130 in FIG. 4, and is a voltage supplying unit that supplies the second electrodes 42 of the holding capacitors 40 with a power source voltage (first voltage) SVDD.

The shift unit 30 includes a circuit illustrated in FIG. 5. As with the PMOS transistor 401 in FIG. 5, the PMOS transistor 140 is a switch for fixing the node N2 to the power source voltage SVDD during the periods T1 and T3 (FIG. 7).

Figure 7:
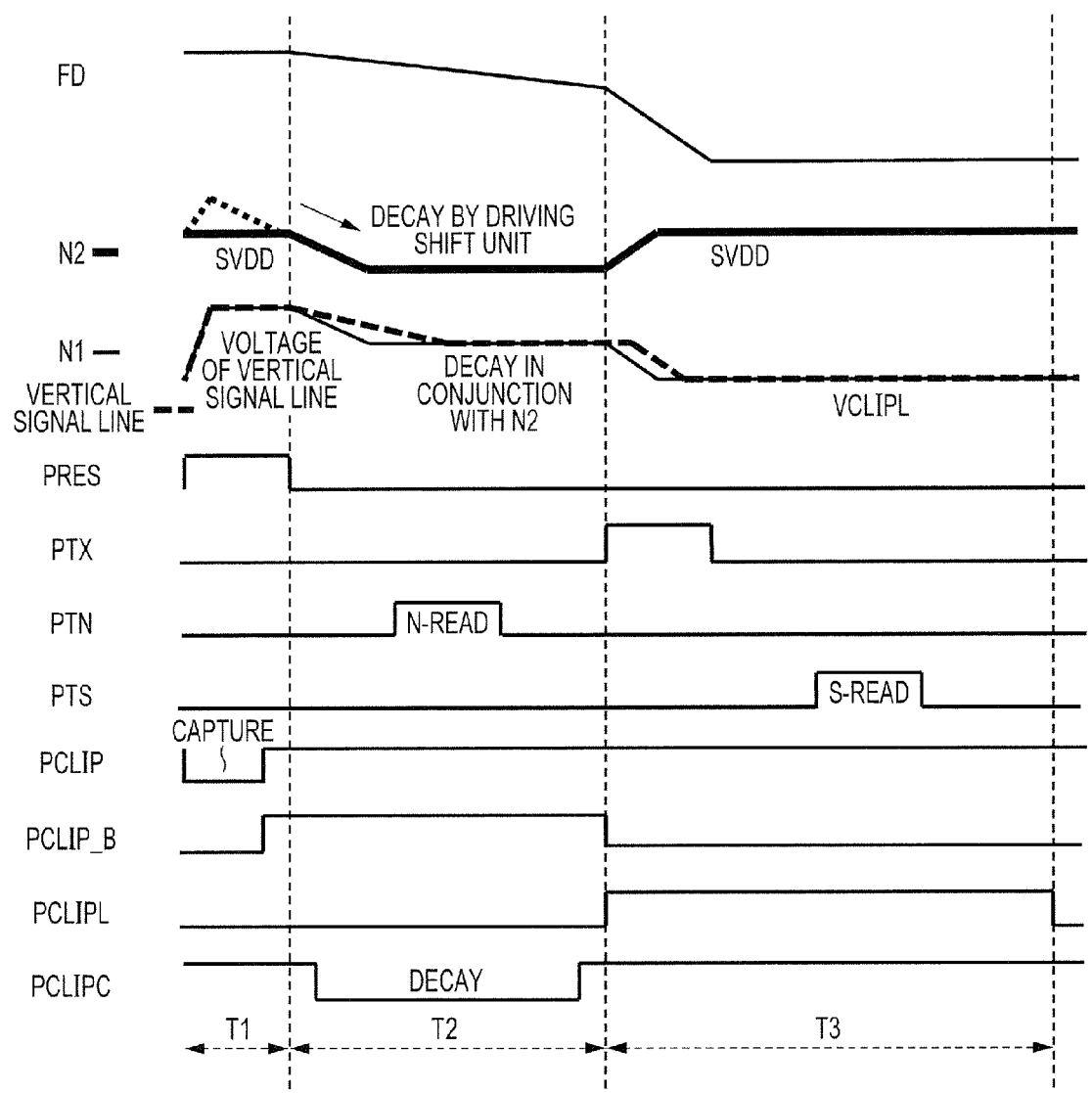
FIG. 7 is a timing chart of an imaging apparatus according to the second embodiment.

FIG. 7 is a timing chart illustrating a method of driving an imaging apparatus 100 according to this embodiment. Potentials FD, N2 and N1 illustrate the potentials of the respective nodes. Driving pulses "PRES" to "PCLIPC" are also illustrated. The difference of FIG. 7 from FIG. 2 is hereinafter described.

First, a normal operation is described. During period T1, the driving pulse PRES is applied to the reset transistor 102, thereby resetting the charge-to-voltage converting portion FD in the pixel 10 to be read, to the reset potential VRESH. The driving pulse PCLIP is then applied to the switch transistor 108 to turn on this transistor.

Here, in a state where the charge-to-voltage converting portion FD is reset, the voltage at the reset level, to be transmitted through the vertical signal line L1 is represented by Expression (1). The voltage $\Delta$ov1 is defined by the characteristics of the amplifying transistor 103 and the value of current of the constant current source 112.

In a state where the charge-to-voltage converting portion FD is reset, the voltage of the noise level transmitted through the vertical signal line L1 is charged in the holding capacitor 40. The potential of the node N1 becomes equal to the noise level transmitted through the vertical signal line L1. If the noise level is at a level equal to the reset level, the potential of the node N1 becomes equal to the reset level.

During the period T1, the potential of the node N2 is fixed to the power source voltage SVDD by turning on the PMOS transistors 140 and 401. The node N1 is connected to the gate of the NMOS transistor 104, thereby allowing the voltage held in the holding capacitor 40 to be fed back to the gate of the NMOS transistor 104.

During the period T2, turning off the PMOS transistors 140 and 401 reduces the potential of the node N2 from the power source voltage SVDD to an arbitrary potential V3. The amount of drop $\Delta$VN2 of the potential of the node N2 is represented by Expression (12).

$$\Delta VN2 = V3 \tag{12}$$

In response to reduction in the potential of the node N2, the potential of the node N1 decreases accordingly. The amount of drop $\Delta$VN1 of the potential of the node N1 is represented by the above Expression (3). Consequently, the potential VN1 of the node N1 is represented by the above Expression (4).

During the period T2, the DDE circuit 50 receives the active driving signal PTN, and holds the voltage at the noise level transmitted through the vertical signal line L1, thereby sampling the noise level of the pixel.

During the period T3, to sample the optical signal level of the pixel, the pulse PCLIPL is applied to the switch transistor 109 to turn on this transistor, and writes the potential VCLIPL as the potential of the node N1. The potential. VCLIPL is set low within a range where the constant current source 112 is not cut off. At this time, the voltage of vertical signal line is clipped so as not to be a potential lower than VCLIPL−Vth2 (the threshold voltage of the NMOS transistor 104)−$\Delta$ov2 (the overdrive voltage of the NMOS transistor 104). Turning on the PMS transistors 140 and 401 resets the potential of the node N2 to the power source voltage SVDD for reading the next pixel 10.

As described above, the potential of the node N1 is VL1res during the period T1, and is VCLIPL during the period T3. The potential of the node N2 is the power source voltage SVDD during each of the periods T1 and T3. The potential of the node N1 varies by VL1res−VCLIPL during transition from the period T3 to the period T1 for reading the pixel 10 on the next row. The potential of the node N2 is kept to be the power source voltage SVDD. Charge/discharge current according to the difference between the potentials of the nodes N1 and N2 ((VL1res−VCLIPL)−SVDD)×the number of columns N flows into the holding capacitor 40. What supplies the charge/discharge current to fix the potential of the node N2 to the power source voltage SVDD during the period T1 is the NMOS transistor 401 of the shift unit 30 and the PMOS transistor 140. If there is no PMOS transistor 140, the number of holding capacitors 40 is, for example, at least 5000 (columns), and the resistance of wiring from the PMOS transistor 401 to the holding capacitor 40 at the position farthest from the PMOS transistor 401 is, for example, at least 500Ω. In this case, a long period, which is several microseconds, is required until the potential of the node N2 is stabilized. Meanwhile, in FIG. 6, the PMOS transistor 140 for fixing the node N2 to the power source voltage SVDD is arranged on the side opposite to the shift unit 30. Consequently, the position farthest from the PMOS transistors 140 and 401 is at the center of the wiring that connects the nodes N2 on the columns to each other. Thus, in comparison with the case of resetting only by the PMOS transistor 401 of the shift unit 30, the resistance of wiring and the number of holding capacitors to be reset are halved, and the CR time constant is reduced to about a quarter. Consequently, the stabilization period can be reduced to about a quarter. Therefore, the reading operation period can be reduced, and the frame speed can be improved.

Next, the operation during the period T2 in the case where the pixels 10 are irradiated with strong light, such as sunlight, is described. When the pixel 10 is irradiated with the strong light, such as sunlight, charges (electrons) overflowing from the photoelectric converting portion PD reduce the potential of the charge-to-voltage converting portion FD. This reduction, in turn, reduces the noise level transmitted through the vertical signal line L1 from the reset level accordingly.

Here, a case is assumed where the shift unit 30 does not shift the potential of the second electrode 42 of the holding capacitor 40. In this case, in the NMOS transistor 104, the potential of the vertical signal line L1 captured by the switch 60 is inputted into the gate without modification, and the potential of the vertical signal line L1 is clipped to the clipping potential Vclip represented by the above Expression (5). That is, the clipping potential Vclip is at a level defined by subtracting the voltage of the above Expression (6) from the reset level. However, the threshold voltage of the NMOS transistor 104 Vth of this embodiment is minus. For example, if the transistor W-length is increased about ten times larger than the NMOS transistor 103 for increasing the driving force, $\Delta$ov2 becomes about zero. Consequently, VL1res≤Vclip. The clipping level, becomes higher than the reset level. The NMOS transistor 104 outputs the clipping voltage. Thus, a correct reset level cannot be outputted. Consequently, the CDS circuit 50 cannot correctly perform the CDS process.

To address this problem, in this embodiment, the shift unit 30 reduces the potential of the second electrode 42 of the holding capacitor 40 by ΔVN2 in Expression (12). In this case, the potential of the vertical signal line L1 reduced by ΔVN1 in Expression (3) is inputted into the gate of the NMOS transistor 104, which clips the potential of the vertical signal line L1 to the clipping potential VclipH represented in the above Expression (7).

That is, the clipping potential VclipH is at a level, of the reset level reduced by the voltage in Expression (13).

$$VL1res-VclipH=(Vth2+\Delta ov2)+\Delta VN1 \quad (13)$$

An appropriate lower limit of (Vth2+Δov2)+ΔVN1 is zero, where VL1res matches with VclipH. This condition is represented by Expression (14).

$$0 \leq (Vth2+\Delta ov2)+\Delta VN1 \quad (14)$$

From Expression (14), Expression (15) is derived. If the potential reduced by ΔVN1 that satisfies Expression (15) is inputted into the gate of the NMOS transistor 104, the clipping level, can be lower than the reset level.

$$-(Vth2+\Delta ov2) \leq \Delta VN1 \quad (15)$$

That is, according to Expressions (3) and (15), if the shift, unit 30 reduces the potential of the second electrode 42 of the holding capacitor 40 by ΔVN2 that satisfies Expression (16), the clipping level, can be lower than the reset level.

$$-(Vth2+\Delta ov2)/K \leq \Delta VN2 \quad (16)$$

If ΔVN2 is too large, the difference between the potentials of the reset level and the clipping level is large. Accordingly, the high-brightness darkening phenomenon cannot be effectively suppressed. Consequently, ΔVN2 can be preferably set such that −(Vth2+Δov2)/K≈ΔVN2 as much as possible.

Figure 8:
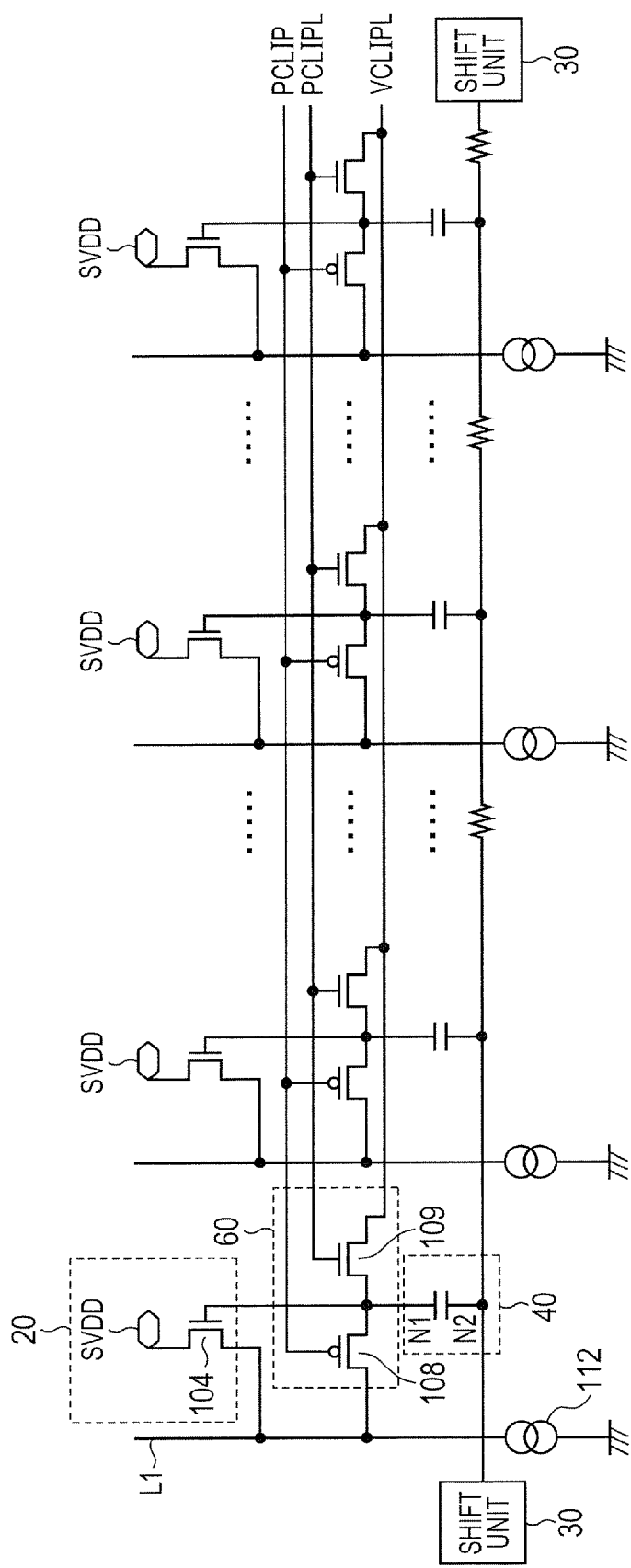
FIG. 8 is a circuit diagram of the second embodiment including shift units on both sides.

This embodiment describes the case where the PMOS transistor 140 for fixing the nodes N2 to the power source voltage SVDD is arranged on the side opposite to the shift unit 30. Alternatively, a configuration in FIG. 8 where the shift units 30 are arranged on the opposite sides may be adopted. The PMOS transistors 401 of the two shift units 30 reset the nodes N2 to the power source voltage SVDD from both the sides, thereby allowing analogous advantageous effects to be achieved.

As described above, in the case where the NMOS transistor 104 is a depression type, the wiring of the nodes N2 is reset to the power source voltage SVDD from the opposite sides during the period T1, thereby halving the resistance of wiring and the number of holding capacitors to be reset, and reducing the CR time constant to about a quarter. Consequently, the stabilization period can be reduced to about a quarter. Thus, the reading operation period can be reduced, and the frame speed can be improved. During the period T2, decay of the nodes N1 can set the clipping potential to be lower than the reset level. Furthermore, ΔVN2 is set such that −(Vth2+Δov2)/K≅ΔVN2, thereby reducing the difference between the reset level and the clipping potential. Consequently, the high-brightness darkening phenomenon can be effectively suppressed from occurring.

According to this embodiment, the potential of the vertical signal line L1 is shifted and fed back to the gate of the NMOS transistor 104. The feedback can suppress adverse effects of variation in characteristics of the pixels (variation in threshold voltage).

(Third Embodiment)

Figure 9:
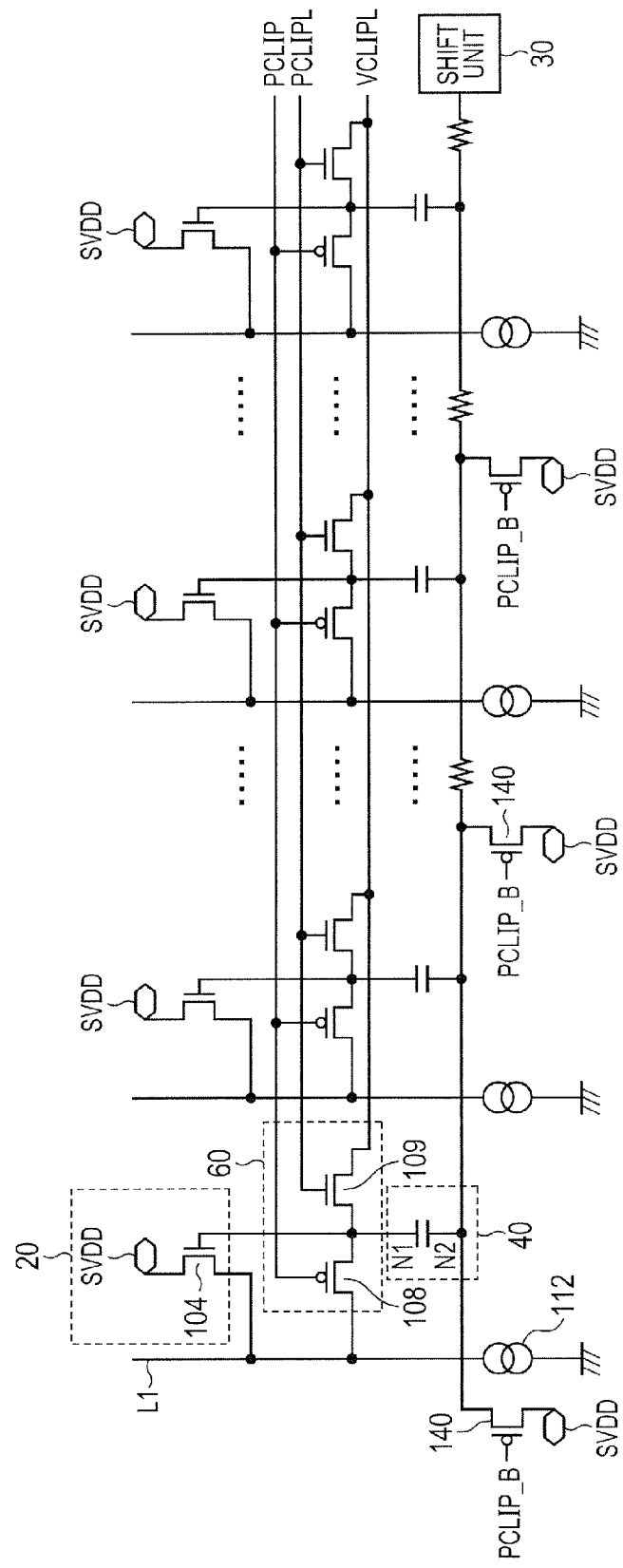
FIG. 9 is a circuit diagram of a plurality of columns of a third embodiment.

An imaging apparatus 100 according to a third embodiment of the present invention is described. As with the second embodiment, the imaging apparatus 100 and the shift unit 30 include the configurations of FIGS. 1 and 5, respectively. FIG. 9 illustrates a circuit diagram where multiple columns of clip units 20, holding capacitors 40 and switches 60 according to this embodiment are arranged. The difference of FIG. 9 from FIG. 6 is hereinafter described.

In the second embodiment (FIG. 6), the single PMOS transistor 140 for fixing the nodes N2 to the power source voltage SVDD is arranged on the side opposite to the shift unit 30. Meanwhile, in this embodiment (FIG. 9), PMOS transistors 140 for resetting the nodes N2 to the power source voltage SVDD are arranged at multiple points on wiring that connects the nodes N2 to each other. The PMOS transistors 140 perform resetting at the respective points. Such resetting reduces the resistance of wiring, the number of holding capacitors to be reset per resetting PMOS transistor 140. Consequently, the CR time constant can be further reduced, which can in turn reduce the stabilization period. The intervals of arrangement of the PMOS transistors 140 for resetting the nodes N2 may be appropriately arranged to be, for example, one transistor for every 100 columns or for every 1000 columns.

The operation of this embodiment is the same as the operation of the second embodiment (FIG. 7). This embodiment can achieve not only the above advantageous effects but also the advantageous effects of the second embodiment.

(Fourth Embodiment)

Figure 10:
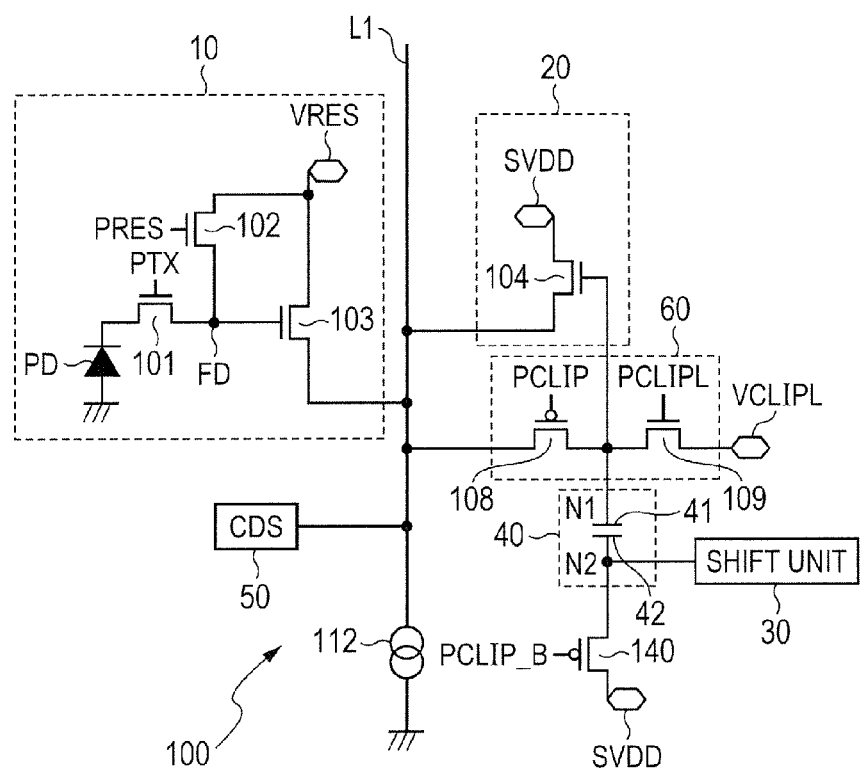
FIG. 10 is a circuit diagram of an imaging apparatus according to a fourth embodiment.

FIG. 10 is a diagram illustrating a configuration example of an imaging apparatus 100 according to a fourth embodiment of the present invention. In FIG. 10, a PMOS transistor 140 is added to the case in FIG. 1. The difference of this embodiment from the second embodiment is hereinafter described. The PMOS transistor 140 includes a source connected to the node of the power source voltage SVDD, a drain connected to the node N0, and a gate into which the signal PCLIP_B is inputted. The shift unit 30 includes a circuit illustrated in FIG. 5. As with the PMOS transistor 401 in FIG. 5, the PMOS transistor 140 is a switch for fixing the nodes N2 to the power source voltage SVDD during the periods T1 and T3 (FIG. 7).

Figure 11:
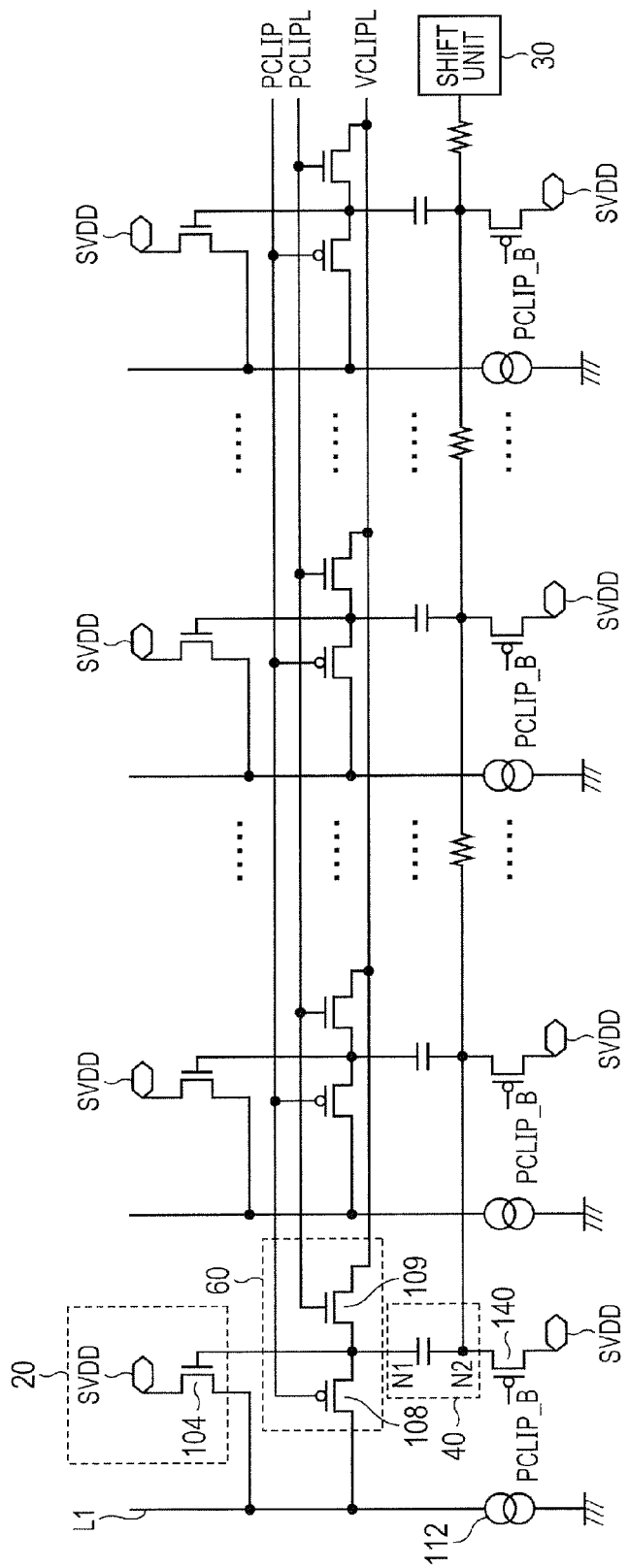
FIG. 11 is a circuit diagram of a plurality of columns of the fourth embodiment.

FIG. 11 is a circuit diagram where multiple columns of clip units 20, holding capacitors 40 and switches 60 according to this embodiment are arranged. The difference of FIG. 11 from FIG. 9 is hereinafter described. In FIG. 9, PMOS transistors 140 for fixing the nodes N2 to the power source voltage SVDD are provided at respective points on wiring that connects the nodes N2 to each other. Meanwhile, in this embodiment (FIG. 11), PMOS transistors 140 for resetting the nodes N2 to the SVDD potential are provided for the respective holding capacitors 40. That is, the PMOS transistors 140 are provided corresponding to the respective holding capacitors 40. The PMOS transistors 140 as many as the holding capacitors 40 are provided, thereby reducing the resistance of wiring and the number of holding capacitors to be reset per resetting PMOS transistor 140. Consequently, the CR time constant can be further reduced, which can in turn reduce the stabilization period.

The operation of this embodiment is the same as the operation of the second embodiment (FIG. 7). This embodiment can achieve not only the above advantageous effects but also the advantageous effects of the second embodiment.

(Fifth Embodiment)

An imaging apparatus 100 of a fifth embodiment of the present invention is described. As with the fourth embodiment, the imaging apparatus 100 and a shift unit 30 have the configurations in FIGS. 10 and 5, respectively. This embodiment is different from the fourth embodiment in that the NMOS transistor 104 and the amplifying transistor 103 are formed in the same well.

Figure 12:
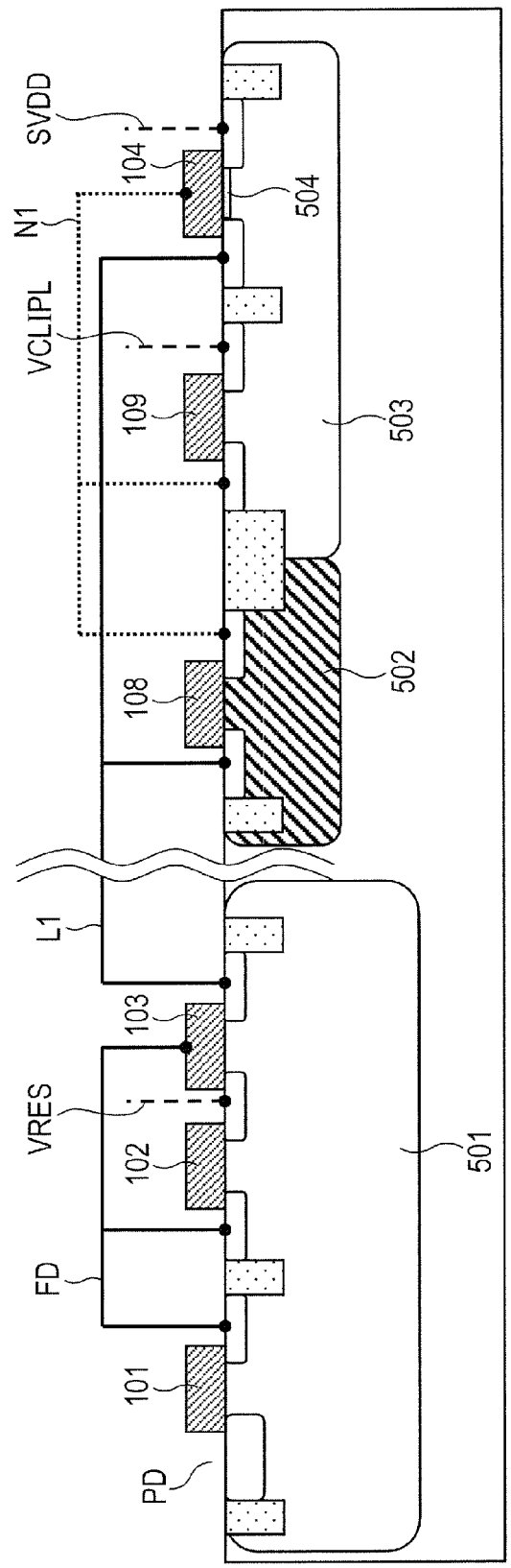
FIG. 12 is a sectional view of the imaging apparatus according to the fourth embodiment.

FIG. 12 is a sectional view of the imaging apparatus 100 of the fourth embodiment. The photoelectric converting portion PD, the transfer portion 101, the charge-to-voltage converting portion FD, the amplifying transistor (output unit) 103 and the reset transistor 102 in the pixel 10 are formed in a pixel P well 501. FIG. 12 only illustrates the elements in one pixel. However, in actuality, a plurality of pixels 10 is arranged in a two-dimensional matrix. At positions apart from the pixel region, a PMOS transistor 108 is formed in an N well 502 for PMOS for peripheral circuits, an NMOS transistor 109 and an NMOS transistor 104 are formed in a P well 503 for NMOS for peripheral circuits. N-type ion species are implanted into a channel region 504 of the NMOS transistor 104, which has a lower threshold than the NMOS transistor 109 has.

Figure 13:
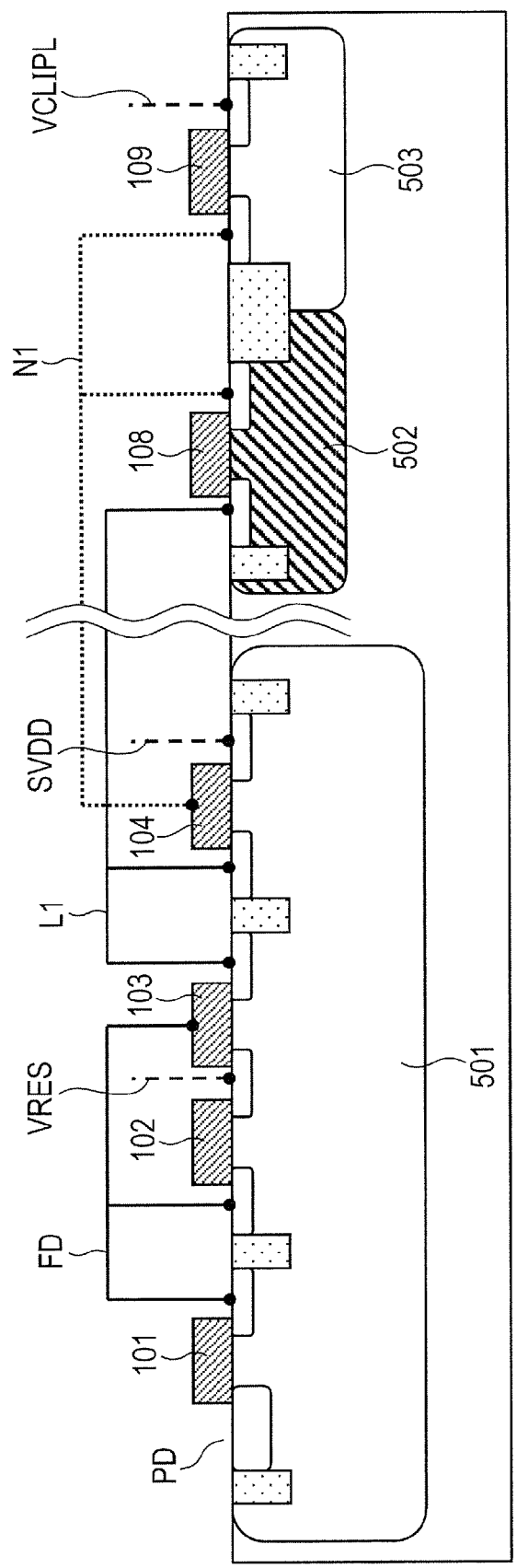
FIG. 13 is a sectional view of an imaging apparatus according to a fifth embodiment.

FIG. 13 is a sectional view of the imaging apparatus 100 of the fifth embodiment. The signs in FIG. 13 correspond to the respective signs in FIG. 10. FIG. 13 is different from FIG. 12 in that the NMOS transistor 104 and the amplifying transistor 103 are formed in the same pixel P well 501. FIG. 13 only illustrates the elements in one pixel. However, the NMOS transistors 104 are formed at ends of pixels 10 arranged into a two-dimensional matrix. The NMOS transistor 104 of the clip unit 20 is thus formed in the pixel P well 501 because an NMOS transistor for a pixel typically has a lower threshold than the NMOS transistor for peripheral circuits has. This is because the reset level of the potential of the vertical output line L1 is as represented by the above Expression (1) and as follows.

$VL1res = VRESH - Vth0$ (the threshold voltage of the reset transistor 102)$-Vth1$ the threshold voltage of the amplifying transistor 103)$-\Delta ov1$ (the overdrive voltage of the amplifying transistor 103)

If the threshold voltage of the reset transistor 102 and the threshold voltage of the amplifying transistor 103 are high, the reset level of the vertical signal line L1 is reduced accordingly. The lower limit of the signal voltage of the vertical signal line L1 is defined as a potential that does not cut off the constant current source 112. This definition resultantly causes a problem in that reduction in, reset level narrows the operation range. Consequently, the threshold of the NMOS transistor for the pixel is set lower than the threshold of the NMOS transistor for peripheral circuits. The threshold of the NMOS transistor for the pixel is thus reduced so as to widen the operation range and increase the signal amplitude as much as possible.

The advantages, of reduction in the threshold voltage of the NMOS transistor 104 are capability of reducing the voltage for shifting the nodes N2 by the shift unit 30. As in the above Expression (8), $VL1res-VclipH=(Vth2+\Delta ov2)-\Delta VN1$ holds. However, if the threshold voltage Vth2 of the NMOS transistor 104 is high, $\Delta VN1$ is required to be set higher accordingly. The amount of shift of the potential of the node N2 during the period T2 is set lower. This setting can suppress the power source voltage and the ground potential during reading of the noise level (N-read) from varying, improve the accuracy of the CDS process in the CDS circuit 50, and suppress the image quality from being degraded.

The operation of this embodiment is the same as the operation of the second embodiment (FIG. 7). This embodiment can achieve not only the above advantageous effects but also the advantageous effects of the second embodiment.

(Sixth Embodiment)

Figure 14:
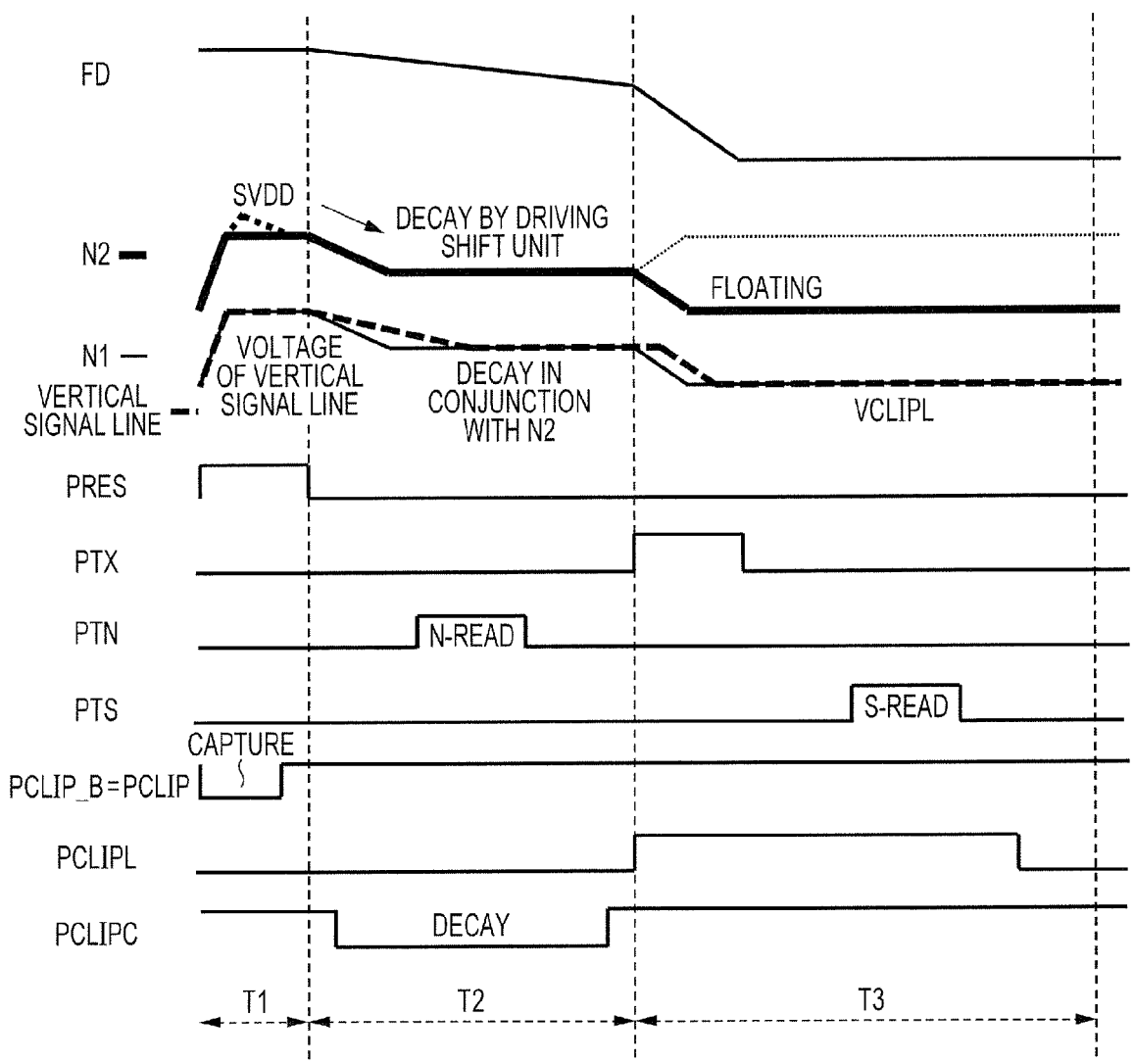
FIG. 14 is a timing chart, of an imaging apparatus according to a sixth embodiment.

An imaging apparatus 100 of a sixth embodiment of the present invention is described. As with the fourth embodiment, the imaging apparatus 100 and the shift unit 30 have the configurations in FIGS. 10 and 5, respectively. FIG. 14 is a timing chart illustrating a method of driving the imaging apparatus 100 of this embodiment. Potentials "FD" to "N2" illustrate the potentials of respective nodes. Driving pulses "PRES" to "PCLIPC" are also illustrated. This embodiment (FIG. 14) is different from the second embodiment (FIG. 7) in characteristics during the period T3. The period T3, where FIG. 14 is different from FIG. 7, is hereinafter described.

During the period T3, to sample the optical signal level of the pixel 10, the pulse PCLIPL is applied to the switch transistor 109 to turn on this transistor, and the potential VCLIPL is written as the potential of the node N1. The potential VCLIPL is set low within a range where the constant current source 112 is not out off. At this time, the potential of the vertical signal line L1 is lipped so as not to be a potential lower than VCLIPL$-$Vth2 (the threshold voltage of the NMOS transistor 104)$-\Delta ov2$ (the overdrive voltage of the NMOS transistor 104). The node N2 comes into a floating state. Consequently, the potential of the node N2 varies by the amount of variation in potential of the node N1. The amount of potential variation $\Delta VN1$ of the potential VN1 of the node N1 is represented by Expression (17).

$$\Delta VN1 = VL1res - \Delta VN1 - VCLIPL \quad (17)$$

In response to variation in the potential of the node N1, the potential of the node N2 also varies. The potential VN2 of the node N2 is represented by Expression (18).

$$VN2 = V1 - K \times \Delta VN1 \quad (18)$$

Each of the pixels 10 outputs the first signal to the vertical signal line L1 during the period T2 in a state where the charge-to-voltage converting portion FD is reset, and outputs the second signal to the vertical signal line L1 in a state where the transfer portion 101 transfers the charges of the photoelectric converting portion PD to the charge-to-voltage converting portion FD. The first signal is at the noise level. The second signal is at the optical signal level. Since the signal PCLIP_B is at the high level during the period T2 in which the pixel 10 outputs the first signal and during the period T3 for outputting the second signal, the PMOS transistors 140 and 401 disconnect the second electrode 42 (node N2) from the node of the power source voltage (first voltage) SVDD. During the period T3 in which the pixel 10 outputs the second signal, the second electrode 42 is in the floating state.

Setting the potential of the node N2 to the floating state allows variation in the potential of the node N1 to vary the potential of the node N2 in a following manner. Consequently, charge/discharge current can be suppressed from flowing in the holding capacitor 40. Variation in the power source voltage and the ground potential due to the charge/discharge current can thus be suppressed. Consequently, occurrence of noise and degradation of image quality can be suppressed. The imaging apparatus 100 of this embodiment includes the PMOS transistors 140 that supply the power source voltage SVDD to the second electrodes 42 corresponding to the vertical signal lines L1 in the respective columns. Consequently, in comparison with the case of supplying the second electrodes 42 on all the columns with the power source voltage SVDD from the common voltage source, the imaging apparatus 100 of this embodiment can reduce the period T1, which is a period for resetting the potentials of the second electrodes 42 to the power source voltage SVDD.

(Seventh Embodiment)

Figure 15:
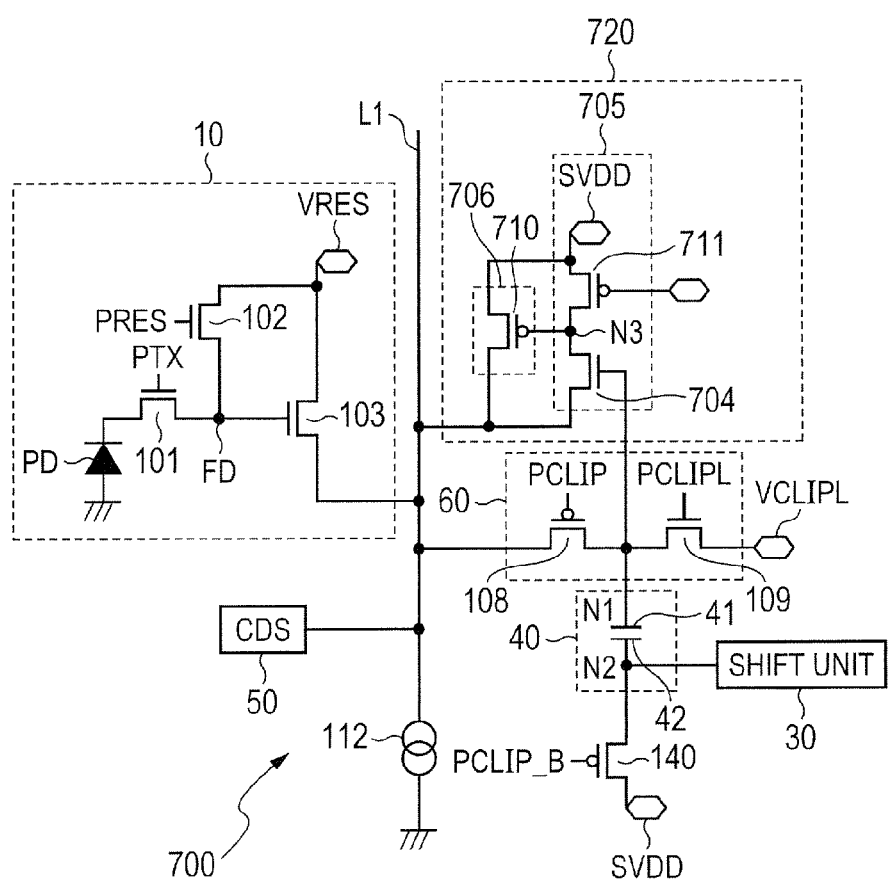
FIG. 15 is a circuit diagram or an imaging apparatus according to a seventh embodiment.

FIG. 15 is a circuit diagram illustrating a configuration example of an imaging apparatus 700 according to a seventh embodiment of the present invention. This embodiment (FIG. 15) includes clip units 720 instead of the clip units 20 of the fourth embodiment (FIG. 10). The clip unit 720, which is the difference of this embodiment from the fourth embodiment, is hereinafter described.

The imaging apparatus 700 includes the clip units 720. Each clip unit 720 includes a common gate type amplifier 705, and a clip transistor 706 that constitutes a part of a common source type amplifier. For example, as with FIG. 11, multiple columns of the common gate type amplifiers 705 and the clip transistors 706 can be provided.

The clip units 720 are connected to the vertical signal lines L1 on the respective columns. Each of the clip units 720 includes a common gate type amplifier 705 and a common source type amplifier 706. The common gate type amplifier 705 includes a first transistor 704. The first transistor 704 includes a drain connected a current source load (transistor) 711, a source connected to the vertical signal line L1, and a gate connected to the first electrode 41 of the holding capacitor 40. The common source type amplifier 706 includes a second transistor 710. The second transistor 710 includes a gate connected to the drain of the first transistor 704, a drain connected to the vertical signal line L1, and a source connected to the node of the power source voltage SVDD.

The common gate type amplifier 705 includes the constant current source 711 and the NMOS transistor 704. The clip transistor 706 includes the WOO transistor 710 whose source is grounded, and constitutes a common source type amplifier circuit together with the constant current source 112 on the vertical signal line L1.

The constant current source 711 is a PMOS transistor that includes a gate connected to a node having a fixed potential (e.g., the ground potential), a source connected to a node having a power source voltage SVDD, and a drain connected to the NMOS transistor 704 and the common source type amplifier circuit 706. The constant current source 711 functions as a current source load that supplies the NMOS transistor 704 with constant current.

In the NMOS transistor 704, the gate is connected to the first electrode 41 of the holding capacitor 40, and the source is connected to the vertical signal line L1 and the drain of the clip MOS transistor 706. The drain of the NMOS transistor 704 is connected to the constant current source 711 and the gate of the clip transistor 706. The NMOS transistor 704 amplifies the amount of drop in potential of the vertical signal line L1 (source) from the voltage (clipping potential) supplied to the gate, and outputs the amplified voltage from the drain.

The gate of the clip transistor 706 is connected to the output node of the common gate type amplifier 705, and to the drain of the NMOS transistor 704. The clip MOS transistor 706 is a PMOS transistor that includes a source connected to the node of the power source voltage SVDD, and a drain connected to the source of the NMOS transistor 704 and the vertical signal line L1. The gate of the common source type amplifier 706 receives the output voltage from the drain of the NMOS transistor 704. If the amount of drop of the potential of the clip MOS transistor 706 is larger than the amount of drop of the potential of the vertical signal line L1 from the clipping potential VclipH, this transistor feeds a high voltage back to the source of the NMOS transistor 704.

If the amount of drop of the potential of the NMOS transistor 704 is larger than the amount of drop of the potential of the vertical signal line L1 from the clipping potential VclipH, this transistor feeds a high voltage back to the source of the clip MOS transistor 706.

This configuration can perform the following clipping operation. When the potential of the vertical signal line L1 decreases and the NMOS transistor 704 is turned on, the potential of the node N3 decreases and the clip MOS transistor 706 is turned on. That is, the gate of the clip MOS transistor 706 is supplied with a potential positively gained according to variation in the potential of the vertical signal line L1. That is, the drain current of the clip MOS transistor 706 sharply increases with reduction in the potential of the vertical signal line L1. If the amount of drop of the potential of the clip PUS transistor 706 is larger than the amount of drop of the potential of the vertical signal line L1 from the clipping potential VclipH, this transistor feeds a higher voltage to the source of the NMOS transistor 704 than the case with the smaller amount. When the total sum of current flowing through the current source load 711 and current through the common source type amplifier 706 is equal to the value of current flowing through the constant current source 112 on the vertical signal line L1, the potential of the vertical signal, line L1 is stabilized.

Here, in view of an appropriate clipping operation, the value of current flowing through the PMOS transistor 711 that serves as the current source load of the NMOS transistor 704 is set lower than the value of current flowing through the constant current source 112, and the gain of the common gate type amplifier 705 is increased. Because of an analogous reason, in an appropriate configuration, the common source type amplifier that includes the clip MOS transistor 706 has a higher transconductance than the constant current source 711 and the NMOS transistor 704.

For example, the value of current of the common gate type amplifier 705 is set to 1/M of the current of the constant current source 112 on the vertical signal line L1. Here, the value of current of the constant current source 112 on the vertical signal line L1 is I1, and M satisfies 1<M. Reduction in the potential of the vertical signal line L1 reduces the potential of the source of the NMOS transistor 704, and turns on the NMOS transistor 704, thereby causing drain current to flow. At this time, the NMOS transistor 704 can cause current that is only 1/M as much as that of the constant current source 112 on the vertical signal line L1 to flow. Consequently, as voltage Vgs between the gate and the source of the NMOS transistor 704 increases, the potential of the drain (node N3) sharply decreases. This sharp reduction in potential of the node N3 turns on the common source type amplifier (PMOS transistor) 706, and sharply increases the drain current of the common source type amplifier 706.

Finally, when the value of current caused to flow by the NMOS transistor 704 becomes I1×1/M and the value of current caused to flow by the common source type amplifier including the clip MOS transistor 706 becomes I1×(M−1)/M, the clip unit (clipping circuit) 720 is stabilized.

It is herein assumed that the clip MOS transistor 706 has a sufficiently higher transconductance than the constant current source 711 and the NMOS transistor 704. It is further assumed that when the potential of the vertical signal line L1 is clipped, the constant current source 711 and the NMOS transistor 704 operate in a saturated region.

As described above, the clipping potential of the potential of the vertical signal line L1 is VRESH−Vth0−Vth1−Δov1−ΔVN1−Vth4 (the threshold voltage of the NMOS transistor 704)−Δov4 (the overdrive voltage of the NMOS transistor 704). Consequently, the potential as a potential at the reset level decreased by (+ΔVN1+Vth4+Δov4).

As described above, the value of current caused to flow by the NMOS transistor 704 in this embodiment is 1/M of the value of current caused to flow by the constant current source 112 on the vertical signal line L1. The overdrive voltage Δov4 can thus be set smaller. Consequently, when the noise level on the vertical signal line L1 decreases, the potential of the vertical signal line L1 to be clipped can be set high. Accordingly, the dynamic range of the vertical signal line L1 can be secured.

The first to seventh embodiments may be appropriately modified and combined. For example, electrons are adopted as the signal charges, and the N-type MOS transistor is adopted as the amplifying transistor 103. Alternatively, holes may be adopted as the signal charges, and a P-type MOS transistor may be adopted as the amplifying transistor 103. In this case, darkening increases the voltage of the noise level. Consequently, the clipping operation is performed so as not to increase equal to or higher than a certain value. In this case, the clipping transistor may be a P-type MOS transistor. The amount of level shift may be appropriately adjusted in conformity with the P-type MOS transistor.

The case has been described where the pixel 10 has the configuration in which the gate potential of the amplifying transistor 103 the potential of the charge-to-voltage converting portion FD) is switched. However, the invention is not limited to this case. For example, a configuration may be adopted where a selecting MOS transistor that controls current flowing through the amplifying MOS transistor 103 is provided on a source side or a drain side of the amplifying MOS transistor 103.

(Eighth Embodiment)

Figure 16:
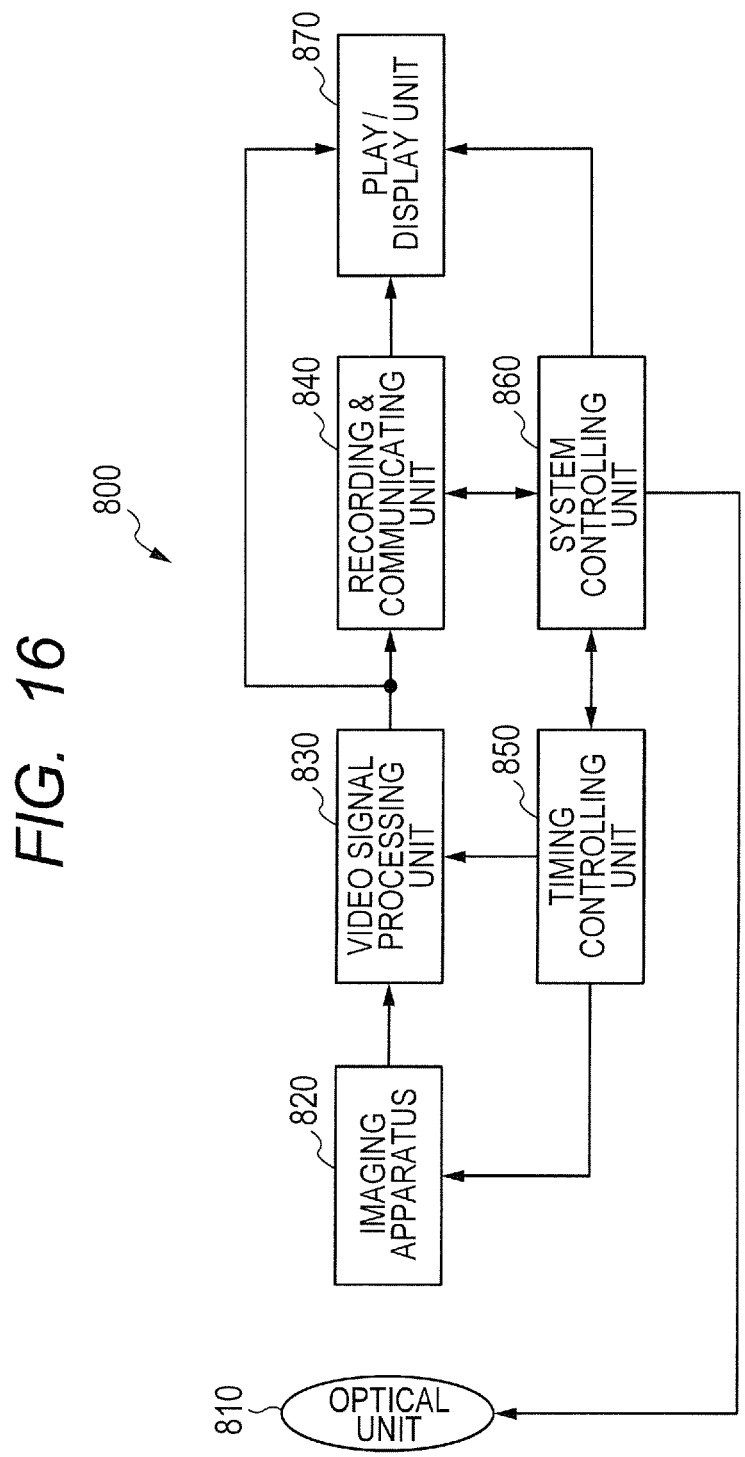
FIG. 16 is a diagram illustrating a configuration example of an imaging system.

FIG. 16 is a diagram illustrating a configuration example of an imaging system according to an eighth embodiment of the present invention. The imaging system 300 includes, for example, an optical unit. 810, an imaging apparatus 820, a video signal processing unit 830, recording and communicating unit 840, a timing controlling unit 850, a system controlling unit 860, and a play/display unit 870. The imaging apparatus 820 may be any of the imaging apparatuses 100 and 700 in the first to seventh embodiments.

The optical unit 810 that is an optical system, such as a lens, forms an image with light from a object on a pixel unit in which pixels of the imaging apparatus 820 are two-dimensionally arranged, thus forming an image of the object. The imaging apparatus 820 outputs a signal according to the light with which the image is formed on the pixel unit, at a timing based on the signal from the timing controlling unit 850. The signal outputted from the imaging apparatus 820 is inputted into the video signal processing unit 830. The video signal processing unit 830 processes the signal according to a method defined by a program. A signal acquired by processing by the video signal processing unit 830 is transmitted as in data to the recording and communicating unit 840. The recording and communicating unit 840 transmits the signal for forming an image to the play/display unit 870, thereby causing the play/display unit 870 to play and display a moving image and a still image. The recording and communicating unit. 840 receives the signal from the video signal processing unit 830, and communicates with the system controlling unit 860, while performing an operation of recording a signal for forming an image in a recording medium, not illustrated.

The system controlling unit 860 integrally controls the operation of the imaging system, and controls driving the optical unit 810, the timing controlling unit 850, the recording and communicating unit 840, and the play/display unit 870. The system controlling unit 860 includes, for example, a recording medium, which is not illustrated. This medium stores a program required to control the operation of the imaging system. The system controlling unit 860 supplies a signal for switching a drive mode according to the operation by a user into the imaging system. In a specific example, the signals for changing the row to be read or reset, changing the angle of view according to electronic zoom, and deviation in angle of view according to electronic vibration isolation. The timing controlling unit. 850 controls the drive timing of the imaging apparatus 820 and the video signal processing unit 830 based on control by the system controlling unit 860.

The first to eighth embodiments can suppress variation in the potential of the second electrode 42 of the holding capacitor 40 when the reset level of the vertical signal line L1 is held in the holding capacitor 40 in a state where the charge-to-voltage converting portion FD is reset, and reduce the stabilization period. Consequently, the speeds of the imaging apparatuses 100 and 700 and the frame speed can be improved.

Embodiment(s) of the present invention can also be realized by a computer of a system or apparatus that reads out and executes computer executable instructions (e.g., one or more programs) recorded on a storage medium (which may also be referred to more fully as a 'non transitory computer-readable storage medium') to perform the functions of one or more of the above-described embodiment(s) and/or that includes one or more circuits (e.g., application specific integrated circuit (ASIC)) for performing the functions or one or more of the above-described embodiment(s), and by a method performed by the computer of system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be not limited to the understood that the invention disclosed exemplary embodiments. The scope of the following claims is to be accorded the broadest interpretation so as to encompass all such modifications and equivalent structures and functions.

This application claims the benefit of Japanese Patent Application No. 2014-136972, filed Jul. 2, 2014, which is hereby incorporated by reference herein in its entirety.

What is claimed is:

1. An imaging apparatus comprising:
a plurality of pixels arranged in a plurality of rows and in a plurality of columns;
a plurality of signal lines, to each of which a signal from a pixel is output;
a plurality of clip units, each having a first transistor, connected to a corresponding one of the plurality of signal lines, and configured to clip a voltage of the each of the signal lines, the plurality of clip units being arranged in a direction corresponding to the row;
a plurality of holding capacitors, each having a first electrode connected to a control electrode of a respective first transistor of one of the clip units, and having a second electrode;
a shift unit configured to supply, to the second electrodes, a plurality of voltages having values different from each other through a wiring; and
a voltage supplying unit configured to supply a first voltage through the wiring to at least one of the second electrodes, wherein:
the wiring is connected electrically to each of the plurality of second electrodes,
the wiring includes an extended portion which extends in the direction corresponding to the row, from a region in which the shift unit is arranged and along the plurality of clip units, and
the voltage supplying unit is connected to the wiring at the extended portion of the wiring.

2. The imaging apparatus according to claim 1, wherein, each of the plurality of signal lines is arranged correspondingly to each of the plurality of columns of the plurality of pixels,
each of the plurality of the clip units is arranged correspondingly to each of the plurality of signal lines,
each of the plurality of the holding capacitors is arranged correspondingly to each the plurality of the clip units, and
the shift unit is arranged at one end of a region in which the plurality of holding capacitors are arranged, while the voltage supplying unit is arranged at the other end of the region in which the plurality of holding capacitors are arranged, where the other end is opposite to the one end.

3. The imaging apparatus according to claim 1, wherein, each of the plurality of signal lines is arranged correspondingly to each of the plurality of columns of the plurality of pixels,
each of the plurality of the clip units is arranged correspondingly to each of the plurality of signal lines,
each of the plurality of the holding capacitors is arranged correspondingly to each the plurality of the clip units, and
each of the plurality of voltage supplying units is arranged correspondingly to each the plurality of holding capacitors.

4. The imaging apparatus according to claim 1, wherein, each of the plurality of the clip units has a common gate type amplifier circuit and a common source type amplifier circuit,
the common gate type amplifier circuit has the first transistor having a drain connected to a current source load, a source connected to the signal line and a gate connected to the first electrode, and
the common source type amplifier circuit has the second transistor having a gate connected to the drain of the first transistor, a drain connected to the signal line and a source connected to a voltage source node.

5. The imaging apparatus according to claim 1, wherein, each of the plurality of pixels comprises:
a photoelectric converting portion;
a charge-to-voltage conversion portion;
a transfer portion configured to transfer an electric charge generated by the photoelectric converting portion to the charge-to-voltage conversion portion; and
an outputting portion configured to output, to the signal line, the signal based on a voltage converted by the charge-to-voltage conversion portion.

6. The imaging apparatus according to claim 5, wherein the outputting portion and the first transistor are arranged in a same well.

7. The imaging apparatus according to claim 5, wherein, in each of the plurality of pixels, the charge-to-voltage conversion portion is in a reset state during a first period, the charge-to-voltage conversion portion is released from the reset state during a second period after the first period,
the voltage supplying unit connects the second electrode to a node of the first voltage during the first period, and disconnects the second electrode from the node of the first voltage during the second period.

8. The imaging apparatus according to claim 5, wherein, in each of the plurality of pixels, a first signal is output to the signal line under a reset state of the charge-to-voltage conversion portion, while a second signal is output to the signal line under a state of transferring the charge from the photoelectric converting portion to the charge-to-voltage conversion portion by the transfer portion, and
the voltage supplying unit disconnects the second electrode from a node of the first voltage during a period of output the first signal from the pixel, and connects the second electrode to the node of the first voltage during a period of output the second signal from the pixel.

9. The imaging apparatus according to claim 5, wherein, in each of the plurality of pixels, a first signal is output to the signal line under a reset state of the charge-to-voltage conversion portion, while a second signal is output to the signal line under a state of transferring the charge from the photoelectric converting portion to the charge-to-voltage conversion portion by the transfer portion, and
the voltage supplying unit disconnects the second electrode from a node of the first voltage during a period of outputting the first signal from the pixel and during a period of output the second signal from the pixel, and sets the second electrode at a floating state during the period of outputting the second signal from the pixel.

10. The imaging apparatus according to claim 1, further comprising a plurality of switches, each configured to selectively connect, to each of the plurality of signal lines, each of the first electrodes of the plurality of holding capacitors.

11. An imaging system comprising:
the imaging apparatus according to claim 1; and
an optical unit configured to focus an image of light onto the imaging apparatus.

* * * * *